US006940847B1

(12) United States Patent
Glitho et al.

(10) Patent No.: US 6,940,847 B1
(45) Date of Patent: Sep. 6, 2005

(54) SYSTEM AND METHOD FOR PROVIDING ACCESS TO SERVICE NODES FROM ENTITIES DISPOSED IN AN INTEGRATED TELECOMMUNICATIONS NETWORK

(75) Inventors: Roch Glitho, Montreal (CA); Christophe Gourraud, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/472,410

(22) Filed: Dec. 27, 1999

Related U.S. Application Data

(60) Provisional application No. 60/116,198, filed on Jan. 15, 1999.

(51) Int. Cl.[7] .............................. H04L 12/66; H04J 3/16

(52) U.S. Cl. ....................... 370/352; 370/466; 370/353; 379/221.09; 709/328

(58) Field of Search ................................ 370/352, 353, 370/466; 709/310, 311, 320, 328; 379/221.09, 221.11

(56) References Cited

U.S. PATENT DOCUMENTS

| | | | | |
|---|---|---|---|---|
| 5,371,781 A | * 12/1994 | Ardon | 379/59 |
| 5,504,804 A | * 4/1996 | Widmark et al. | 379/63 |
| 5,915,008 A | * 6/1999 | Dulman | 379/201 |
| 5,917,817 A | * 6/1999 | Dunn et al. | 370/352 |
| 5,956,509 A | * 9/1999 | Kevner | 395/684 |
| 6,128,304 A | * 10/2000 | Gardell et al. | 370/401 |
| 6,128,503 A | * 10/2000 | Granberg et al. | 455/461 |
| 6,181,703 B1 | * 1/2001 | Christie et al. | 370/410 |
| 6,282,193 B1 | * 8/2001 | Hluchyj et al. | 370/356 |
| 6,282,281 B1 | * 8/2001 | Low | 379/230 |
| 6,317,428 B1 | * 11/2001 | Mercouroff et al. | 370/360 |

FOREIGN PATENT DOCUMENTS

| | | | |
|---|---|---|---|
| EP | 0924942 A2 | 6/1999 | |
| SE | WO 98/36542 | * 11/1998 | H04L/12/66 |
| WO | WO96/38018 | 11/1996 | |
| WO | WO97/16007 | 5/1997 | |
| WO | WO98/36542 | 8/1998 | |

OTHER PUBLICATIONS

Lu et al., Toward the PSTN/ Internet Inter–Networking—Pre–PINT Implementations, Nov. 18, 1998, The Internet Society, RFC 2458.*

Petrack et al., The PINT Profile of SIP and SDP: a Protocol for IP Access to Telephone Call Services, Nov. 18, 1998, The Internet Society, PINT Working Group Internet–Draft.*

Rizzetto and Catania, "A Voice Over IP Service Architecture for Integrated Communications", May/Jun. 1999, pp. 34–40.

Takeuchi, Nagayama, Miura, and Tanaka, "Interfaces for Interworking Among Intelligent Networks, Computer Telephony, and Voice Over IP Systems", 1999, 1916–1920.

* cited by examiner

*Primary Examiner*—Duc Ho
(74) *Attorney, Agent, or Firm*—Smith & Danamraj, P.C.

(57) ABSTRACT

A system and method of accessing services from end terminals disposed in an integrated telecommunications network having a packet-switched network (PSN) portion such as, for example, a network portion using the Internet Protocol (IP) and a circuit-switched network (CSN) portion such as, for example, a wireless telephony network portion. A generalized service invocation and realization architecture includes one or more call control modules modified to include service-related Detection Points (DPs), a Service Access component or instance that is created when a new DP is encountered, and one or several service proxies which invoke services on behalf of the Service Access component and mediate between the call control modules and services. A common Service Logic Environment is implemented for local services, mobile agent services, and remote services. The PSN portion is preferably realized as a Voice-over-IP (VoIP) network having a gateway connected to the CSN portion.

13 Claims, 20 Drawing Sheets

SYSTEM AND METHOD FOR PROVIDING ACCESS TO SERVICE NODES FROM ENTITIES DISPOSED IN AN INTEGRATED TELECOMMUNICATIONS NETWORK

PRIORITY STATEMENT UNDER 35 U.S.C §119 (e) & 37 C.F.R. §1.78

This nonprovisional application claims priority based upon the following prior U.S. provisional patent application entitled: "Enhancing Supplementary Services through the Use of Intelligent Network Principles and Accessing Service Nodes from End Terminals," Ser. No. 60/116,198 filed Jan. 15, 1999, in the names of: Roch Glitho and Christophe Gourraud.

CROSS-REFERENCE TO RELATED APPLICATIONS

This application discloses subject matter related to the subject matter disclosed in the following co-assigned patent application: "System and Method for Providing Supplementary Services (SS) in an Integrated Telecommunications Network," filed Dec. 10, 1999, Ser. No. 09/472,410, in the names of: Roch Glitho and Christophe Gourraud.

BACKGROUND OF THE INVENTION

1. Technical Field of the Invention

The present invention relates to integrated telecommunication systems and, more particularly, to a system and method for providing access to service nodes from entities (e.g., endpoints, terminals, gatekeepers, etc.) disposed in an integrated telecommunications network. The exemplary integrated telecommunications network may comprise a packet-switched network (PSN) coupled to a circuit-switched network (CSN). Also, the network may comprise a PSN portion only.

2. Description of Related Art

Coupled with the phenomenal growth in popularity of the Internet, there has been a tremendous interest in using packet-switched network (PSN) infrastructures (e.g., those based on Internet Protocol (IP) addressing) as a replacement for, or as an adjunct to, the existing circuit-switched network (CSN) infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Some of the market drivers that impel the existing Voice-over-IP (VoIP) technology are: improvements in the quality of IP telephony; the Internet phenomenon; emergence of standards; cost-effective price-points for advanced services via media-rich call management, et cetera. Some of the emerging standards in this area are the well-known H.323 protocol, developed by the International Telecommunications Union (ITU), Session Initiation Protocol (SIP) or Internet Protocol Device Control (IPDC) by the Internet Engineering Task Force (IETF), or Simple/Media Gateway Control Protocol (SGCP or MGCP). Using these IP standards, devices such as personal computers can interoperate seamlessly in a vast inter-network, sharing a mixture of audio, video, and data across all forms of packet-based networks which may interface with circuit-switched network portions.

As is well-known in the telecommunications industry, services and service provisioning are the raison d'être of a telecommunications network, including VoIP networks. Services are typically categorized into (i) "basic services" (i.e., services which allow basic call processes such as call establishment and termination) or (ii) "advanced services" which are also commonly referred to as Value-Added Services (VAS). It is also well-known that advanced services operate as factors for market differentiation and are crucial for network operators' (or service providers') success.

Because of the integration of PSNs and CSNs, two approaches are available for providing Value-Added Services (also known in H.323-based VoIP networks as Supplementary Services) in VoIP networks. The IP-based VAS architecture is based on the notion that because telephony call control logically resides within the end terminals of the network, service implementation should preferably be localized therein also. This architecture makes terminals the primary actors for IP VAS. On the other hand, there exists an Intelligent Network (IN) or Wireless IntelligentNetwork (WIN) service architecture for providing VAS in the context of CSNs. The WIN/IN service architecture is network-centric, that is, service implementation is done in the network, with centralized service logic in a service node (e.g., a Service Control Point or SCP) that is accessed by switching entities. Applied to IP telephony, this implies access from such entities as gatekeepers (in H.323 networks) or proxy/redirect servers (in SIP networks).

It should be apparent to those skilled in the art that each of the VAS approaches set forth above has its own shortcomings and deficiencies. For instance, in IP-based VAS architectures, a significant concern is that the architecture does not address service mobility (i.e., end-user can access the services regardless of the terminal/appliance used). Also, typically a small number of services are provided in these approaches, which tend to be rather simple as well. Further, as the number of services available increases, the issue of service interaction becomes more significant because there is no centralized logic for resolving contentions or conflicts among the services.

In the case of WIN/IN service architectures, a principal drawback is the complexity of the CSN itself. Also, another significant shortcoming is that network-based service architectures do not scale reliably as the number of available services keeps increasing.

As is well known, there have been several VAS solutions, depending upon the particular standard used in IP telephony. For example, the H.323 standard comes equipped with the H.450 protocol for Supplementary Services (SS). Similarly, there are solutions such as Call Processing Language (CPL) for the SIP-based IP telephony. Also, there exist Application Programming Interface (API)-based solutions such as, e.g., Parlay, VHE/OSA, etc.

However, it should be appreciated by those of ordinary skill in the art that several shortcomings and weaknesses exist in the state-of-the-art service provisioning schemes in VoIP networks, regardless of whether they are H.323-based, SIP-based, or otherwise. For example, none of the solutions is complete or fully satisfactory per se. Service invocation is usually not addressed in these solutions. If addressed at all, service invocation capabilities are rather limited and poorly provided. Further, each solution is a "closed" entity in that it does not permit the integration of other solutions, either existing or yet to come.

Based on the foregoing, it is apparent that there has arisen an acute need for a service provisioning architecture for use within the context of the burgeoning VoIP technology which overcomes these and other shortcomings and deficiencies of the current IP- and WIN/IN-based service architectures. The present invention provides such a solution.

SUMMARY OF THE INVENTION

Accordingly, the present invention advantageously provides a generalized service invocation and realization architecture for use with an integrated telecommunications network preferably comprising a PSN portion that is operable with any known IP standard. The service invocation and realization architecture includes one or several IP telephony call control modules which integrate the IN-derived Detection Points (DPs) and implement an API which allows services to influence ongoing calls. The call control modules may be implemented in terminals, H.323 gatekeepers, SIP entities, in Media Gateway-Controllers (MGCs), or any node in the network that is capable of effectuating call control. A Service Access component or instance—responsible for evaluating service requests and for creating appropriate service proxies when a new DP is encountered in call control—is provided. Thus, one or several specialized service proxies which actually invoke services on behalf of the Service Access component and mediate between the services and the call control, if necessary, are also included in the service architecture of the present invention. In addition, services—which may be implemented using several technologies, e.g., IN/AIN/WIN/CAMEL Service Control Points, non-IN-related application servers (e.g., Parlay application server), call control-resident services (e.g., Java executables), service scripts (e.g., SIP CPL, SIP CGI, etc.), or mobile agents—are implemented as within a universally accessible Service Logic Environment or Environments.

Further, the service proxies and the Service Access component operate in concert as a Service Access server to provide access to local services, mobile agent services, or remote service nodes in an appropriate Service Logic Environment. A user profile used by the various components to invoke the right services at the right time is included in the service architecture. This user profile may partly be co-resident with the call control module, or reside at a remote location that is retrievable. In addition, the profile may preferably be modifiable by various applications, including services implemented as mobile agents.

In one aspect, the present invention is directed to method of accessing a service node, preferably, e.g.,;a Wireless Intelligent Network (WIN) node, from an end terminal disposed in an integrated telecommunications network having a Voice-over-Internet Protocol (VoIP)-based PSN portion and a cellular network portion. An interface module is disposed between the service node and the PSN-VoIP portion. The method incorporates one or more detection points (DPs) in a call control process provided with the end terminal. The DPs are preferably WIN-compliant, and operate to pass control to a Service Access instance of the Service Access server when the call control process encounters an armed DP of appropriate type. Thereafter, the Service Access server determines if one or more services need to be executed. If so, a service request is sent from a service proxy of the Service Access server to the service node for service execution. Responsive to the service request, a result is received in the Service Access server from the service node. Subsequently, the result is forwarded from the Service Access server to the call control process of the end terminal.

In another aspect, the present invention is directed to a service provisioning method for invoking a WIN service by an end terminal disposed in an integrated telecommunications network having a PSN-VoIP portion and a cellular network portion. The method commences by first effectuating a call control process in the end terminal. A determination is made in the end terminal if an armed DP associated with a service request is encountered by the call control process. The call control process then creates a suitable Service Access instance which evaluates the service request and creates a service proxy accordingly. Thereafter, a service node disposed in the cellular network is accessed by the service proxy. Subsequently, a service logic portion in the service node is executed to obtain a result which is provided to the call control process in the end terminal.

In yet another aspect, the present invention is directed to an integrated telecommunications network wherein IP entities (e.g., end terminals) are capable of accessing service nodes disposed therein. The integrated telecommunications network includes a PSN portion provided as a VoIP network with one or more end terminals, a circuit-switched network (CSN) portion coupled to the PSN portion via a gateway, and a service node disposed in the CSN portion. The service node includes service logic portions for executing one or more services and is coupled to the PSN portion via an interface. A user profile repository, accessed via a user profile retriever, is disposed in the PSN portion, which includes a list of triggers for a particular end-terminal-and-subscriber combination. A call controller is provided in the end terminal for controlling a call process. Also included is a Service Access server that provides access to a service node over a suitable interface using a service proxy. When an armed DP is encountered in the call process, the call controller creates a Service Access instance as part of the Service Access server and passes control thereto depending on the DP's type. After evaluating the service request or requests, an appropriate proxy is created which engages in appropriate messaging with the service node for executing a service logic portion thereof.

In yet further embodiments, the above-mentioned aspects of the present invention may be practiced with non-IN/WIN services also.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EMBODIMENTS

Figure 1A:
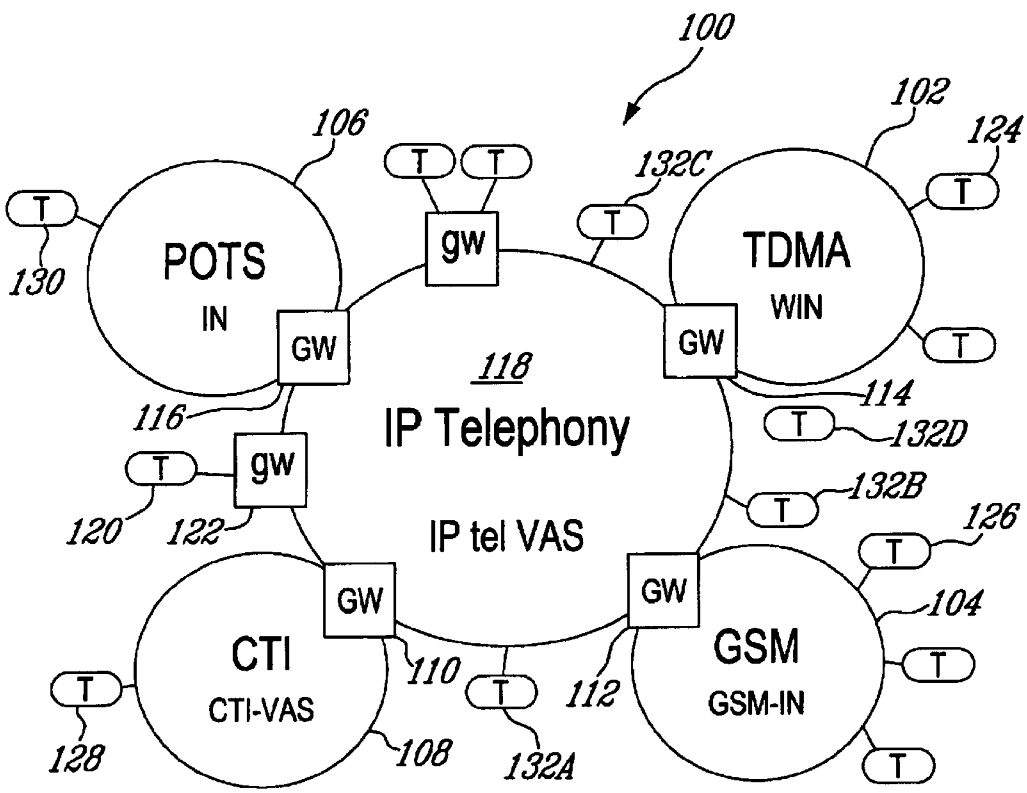
FIG. 1A depicts a generalized integrated telecommunications network wherein one or more CSN portions are coupled to an IP-based PSN.

In the drawings, like or similar elements are designated with identical reference numerals throughout the several views, and the various elements depicted are not necessarily drawn to scale. Referring now to FIG. 1A, depicted therein is a generalized integrated telecommunications network 100 wherein one or more heterogeneous CSN portions are coupled to an IP telephony network 118 (such as, e.g., one based on H.323, SIP, and the like) having Value-Added Services in accordance with the teachings of the present invention. Each of the CSN portions is provided with a suitable gateway for coupling to the IP telephony network portion. For example, a Time Division Multiple Access (TDMA) cellular network portion 102 is coupled to the IP telephony network portion 118 via gateway (GW) 114. In a similar manner, GW 116 is provided between the Plain Old Telephone System (POTS) network portion 106 and the IP telephony network portion.

Each of the CSN portions may be provided with its own service architecture for the provisioning of advanced services. For example, the TDMA network portion 102, which includes one or more mobile terminals, e.g., T 124, may be provided with WIN service architecture. One or more IP terminals or appliances, e.g., T 132A through T 132D, are disposed directly on the IP telephony network portion 118. Furthermore, although not shown in FIG. 1, other entities may be provided as part of the IP telephony network portion 118 depending upon the specific implementation, for example, gatekeepers and Multipoint Control Units (MCUs) (in the case of H.323 implementation), or proxy servers, redirect servers, registrars and so on (in the case of SIP implementation). Also, one or more legacy telephones or appliances (e.g., T 120) are coupled to the IP telephony network portion 118 via an IP adapter or "gateway" (e.g., gw 122).

Figure 1B:
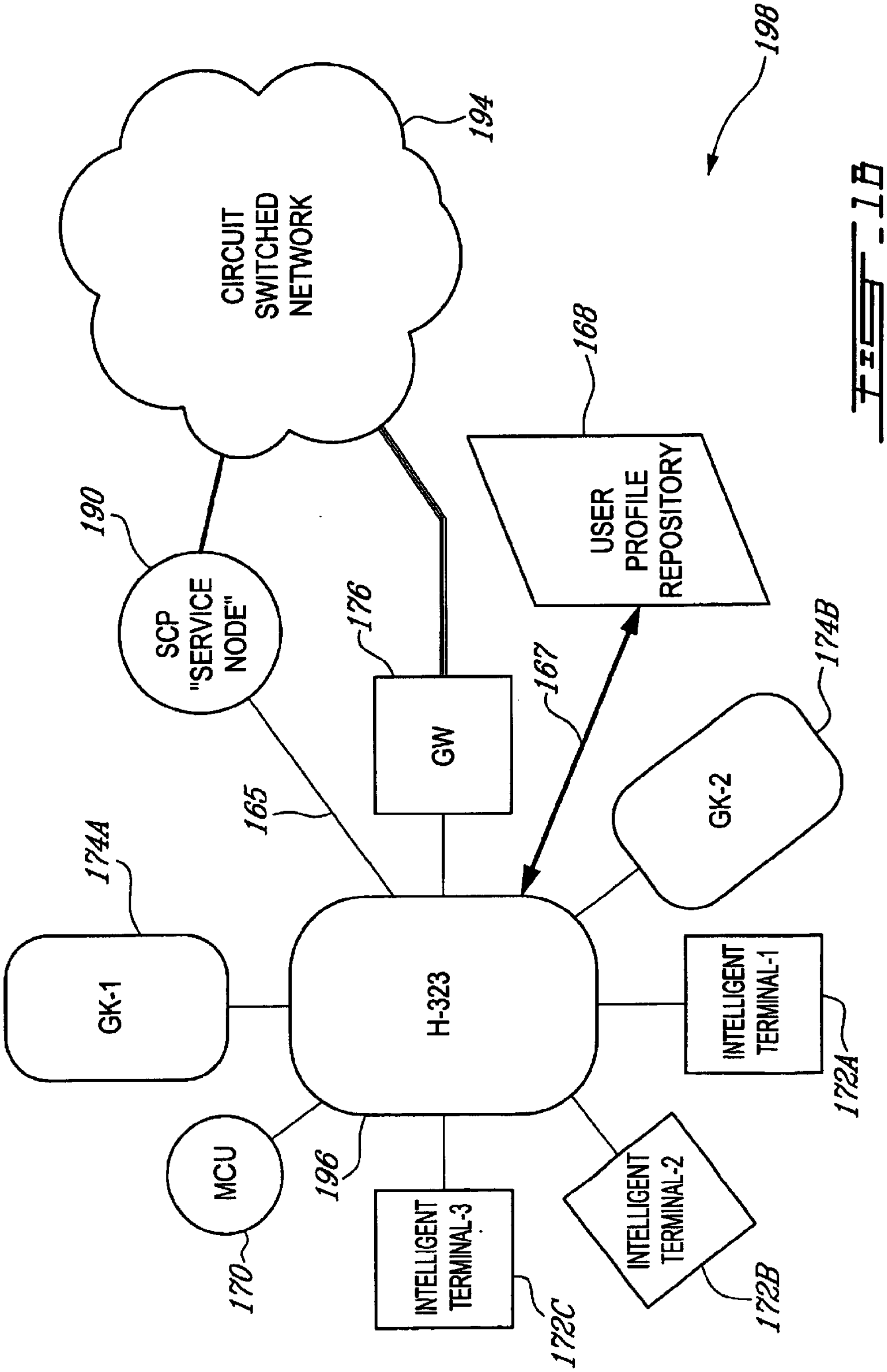
FIG. 1B depicts a functional block diagram of an exemplary embodiment of an integrated telecommunications network having an H.323-based network portion and a cellular network portion, wherein the teachings of the present invention are advantageously employed.

FIG. 1B depicts a functional block diagram of an exemplary telecommunications network 198 with the H.323 implementation. A GW 176 is disposed between an H.323 IP network portion 196 and a circuit-switched cellular network portion 194 of the telecommunications network 198. One or more service nodes including at least a Service Control Point (SCP), for example, SCP service node 190, optimized for providing advanced services in the framework of WIN/IN architecture, is provided as part of the infrastructure of the circuit-switched cellular network portion 194. Furthermore, in accordance with the teachings of the present invention, a service node converter interface (I/F) may be provided between the H.323 network portion 196 and the SCP service node 190 such that an H.323 entity, e.g., a gatekeeper or a terminal, can interrogate the service node 190 for invoking a subscriber service. Preferably, the converter (not shown in this FIG.) is associated with a communication path 165, using SS7 or IP, between the H.323 portion 196 and the service node 190. A plurality of "intelligent" H.323 terminals (i.e., "service-active" or "service-capable" terminals), e.g., terminal-1 172A (TA) through terminal-3 172C (TC), one or more gatekeepers (GKs), e.g., GK-1 174A and GK-2 174B, and an MCU 170 are disposed in the H.323 network portion 196 in a conventional manner.

In accordance with the teachings of the present invention, a user profile repository 168 is provided as part of the telecommunications network 198 for generating triggers to the service node 190. The user profile repository 168 is interfaced within the H.323 network portion via a suitable interface 167 such as a HyperText Transfer Protocol (HTTP) interface or Lightweight Directory Access Protocol (LDAP) interface. A user profile retriever (not explicitly depicted in this FIG.) is included for retrieving user profile information to be provided to various call/service components, as will be discussed in greater detail hereinbelow.

Whether a trigger should be generated to the service node 190 depends on the VAS activated in the network 198, in addition to whether the end-user has an active subscription to it. In order to determine when to suspend and generate triggers, a call control entity (shown in FIG. 2B hereinbelow) is provided with the capability to interface/interact with the user profile retriever to obtain a set of triggers (i.e., end-user profile) associated with the end-user. However, it should be appreciated that some constant services, not subject to explicit subscription, or for performance reasons, may give rise to some service triggers being stored locally (that is, within an H.323 entity such as a terminal, gatekeeper, or a media gateway controller (MGC)). Further, while the user profile repository 168 is shown in this exemplary embodiment as a separate entity, it should be understood that the repository may be co-located with an IP mobility management entity or the service node 190 itself.

Figure 1C:
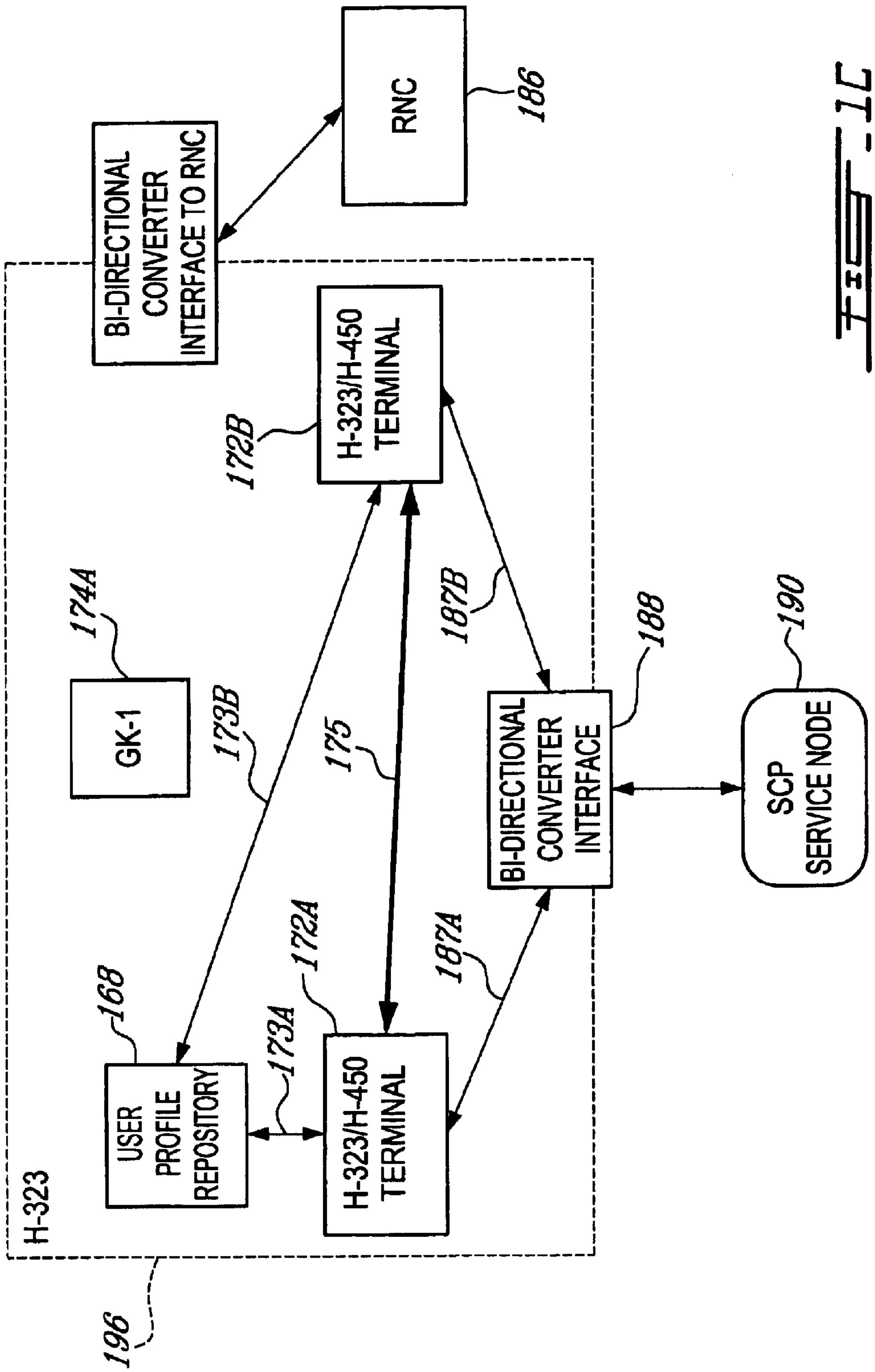
FIG. 1C depicts a functional block diagram indicating signal flow paths of a presently preferred exemplary embodiment of a service provisioning architecture in an integrated telecommunications network with an H.323-based VoIP portion.

In the presently preferred exemplary embodiment of the present invention, the service node 190 may be accessed by a host of H.323 entities such as the terminals, gatekeepers, media gateway controllers, etc. For example, FIG. 1C depicts a functional block diagram with signal flow paths for effectuating service node access in an exemplary embodiment of an H.323 VoIP network wherein an IP terminal is provided with the capability of accessing a service node, e.g., SCP service node 190. Those of ordinary skill in the art should readily appreciate that the signal flow diagram shown in FIG. IC is an abstraction of the network 198 shown in FIG. 1B, having only relevant entities shown therein. For example, the terminal-1 172A and terminal-2 172B are provided with the signal paths 173A and 173B, respectively, for interfacing with the user profile repository 168. Also, signal paths 187A and 187B are provided between the service node converter interface 188 and the two terminals, respectively, for accessing the SCP service node 190. As can be readily seen, GK-1174A is not provided with a signal path to the user profile repository 168 in this exemplary embodiment. However, it should be understood by those skilled in the art that in some implementations, a gatekeeper and/or other IP entities, for example, an MGC, may also be provided with respective signal paths to either the user profile repository 168, service node converter interface 188, or both. Furthermore, a provision may be made for service triggering over a radio interface (e.g., a General Packet Radio System (GPRS) interface).

Figure 2A:
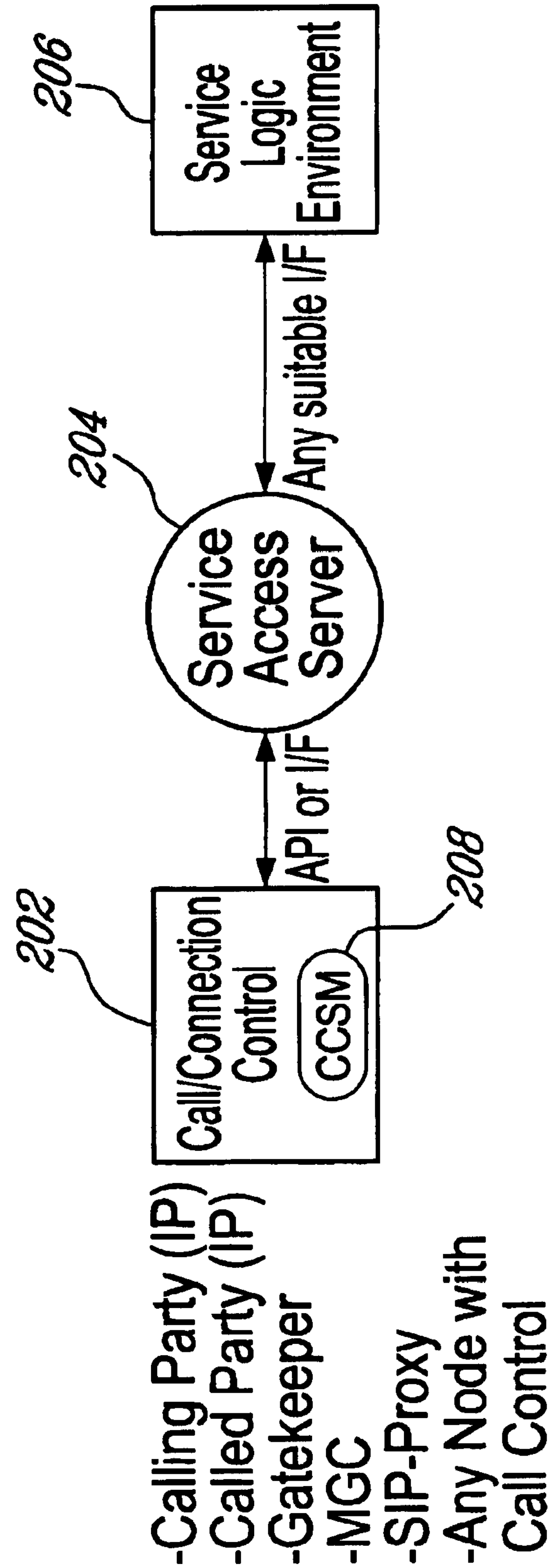
FIG. 2A depicts a high-level functional model of a service provisioning scheme for use in an integrated telecommunications network.

The advantageous feature of providing access to service nodes from several types of IP entities is enabled by providing a common framework for call control, service access, and signaling with respect to such entities. FIG. 2A depicts a high-level functional model which illustrates the relationship between call/connection control and VAS in accordance with the teachings of the present invention. It should be realized that this functional model is independent of the particular standard used for IP telephony and, accordingly, provides a universal service invocation and realization architecture for implementing VAS in IP telephony networks. Essentially, the service invocation and realization architecture is comprised of the following:

- One or several IP telephony call control modules (e.g., module 202), which integrate the IN-derived Detection Points (DPs) and implement an API which allows services to influence ongoing calls. The call control modules may be implemented in terminals, H.323 gatekeepers, SIP proxies, in MGCs, or any node in the network that is capable of effectuating call control.
- A Service Access module (e.g., Service Access server 204) responsible for the invocation of VAS, whose functionality is preferably distributed between a Service Access component/instance and one or more specialized service proxies (shown in FIG. 2B and described hereinbelow) which actually invoke services on behalf of the Service Access component and mediate between the services and the call control, if necessary.
- Services (more universally, Service Logic Environment 206) which may be implemented using several technologies, e.g., IN/AIN/WIN Service Control Points, non-IN-related application servers (e.g., Parlay application server), call control-resident services (e.g., Java executables), service scripts (e.g., SIP CPL, SIP CGI, etc.), or mobile agents.
- A user profile (described in greater detail hereinbelow with respect to FIG. 2D) which is used by the various components to invoke the right services at the right time. This user profile may partly be co-resident with the call control module, or reside at a remote location that is retrievable. In addition, the profile may preferably be modifiable by various applications, including services implemented as mobile agents.

It should be realized that the universal service invocation and realization architecture set forth above advantageously reconciles existing as well as those yet to come IP VAS solutions in a coherent and powerful execution and realization environment.

Functionally, when the call/connection control module 202 is activated pursuant to a call being made by an IP entity such as, for example, a calling party, a called party, gatekeeper, or an MGC, a suitable Call Control State Machine (CCSM) 208 is effectuated for providing a mechanism for detecting when the control needs to be passed to the Service Access server module 204. As set forth above, the service proxy actually invokes services on behalf of the Service Access component therein and operates a mediating interface between the services and the call control. Preferably, the functionality of the Service Access server 204 includes determining service events and their order based on the inputs—and possibly other conditions, e.g., time—from the call/connection control module 202. The Service Access server 204 also determines the location of appropriate service logic (WIN and/or non-WIN) for carrying out the service events. In relation thereto, the functionality of the service proxies may include the following tasks:

- encapsulate service triggers, etc.;
- mediate between service client and service server by using appropriate call models, protocols, logics, et cetera; and
- provide event buffering.

The service logic environment 206 includes appropriate service logic and operates as a server for the services provided by the network. It is typically implemented as a service or application node in the network and is coupled to the Service Access server 204 via any suitable interface such as for example, HTTP, Java RMI, Corba, ASCII/IP, etc. Furthermore, as will be explained hereinbelow, some of the services may be local as well.

From a service execution perspective, the three modules interoperate as follows: The call/connection control module 202 preferably corresponds to the functionality of WIN/IN Call Control Function (CCF). It implements the CCSM 208, handles call-related user interactions and signaling, and performs basic call control processing. Its connection to the provisioning of VAS consists of: being able to suspend call processing depending on the type of DP or DPs encountered, creating a Service Access component as part of the Service Access server and passing control information thereto when call processing is to be suspended, and handle VAS answers and/or requests.

The service proxies of the Service Access server handle interactions with the service logic, whether it is local or stored at a remote location. The service proxies may also evaluate service criteria, sequence service triggers (also referred to as Feature Interaction Management or FIM), generate actual triggers and handles requests from the service logic environment 206.

The service logic environment 206 executes appropriate service logic or logic portions ("logics"). It may be provided either locally or remotely with respect to the call/connection control module 202. In accordance with WIN architecture, the service logic environment 206 preferably comprises an SCP node that is accessed remotely. It arbitrates and resolves contentions among multiple service logics for execution, if necessary.

From a VAS perspective, the responsibilities of each functional module are as follows: The call/connection control module 202 is preferably provided with the awareness as to when services may possibly be executed. Preferably, this knowledge comes with the initial retrieval of the end-user profile from the user profile repository 168 (depicted in FIG. 1B). However, in a presently preferred exemplary embodiment of the present invention, the call/connection control module 202 may not possess any knowledge with respect to whether a service is in fact to be executed, and if so, whether one or more services are to be sequenced and what the services are.

The service proxies are preferably provided as modules which evaluate whether one or more services are to be executed or not. In a presently preferred exemplary embodiment, these proxies do not know what the services are, although they are aware of the specific service invoking mechanisms. The service logic environment module 206 is the module that is actually aware of the services to be executed. Preferably, based on the decisions taken by the service logic or logics, it provides a unique answer to the proxies in the Service Access server 204.

As stated elsewhere in the patent application, the present invention is directed to providing the capability in IP entities such as terminals (H.323 or SIP), etc. of accessing service nodes that are preferably WIN/IN-compliant and taking an appropriate action based on the result or results obtained therefrom. In other words, the IP entities are preferably provided with switching functionality necessary for taking service-related actions themselves. As will be described in greater detail hereinbelow, the CCSMs of the IP entities are modified in accordance with the teachings of the present invention so as to facilitate the foregoing objects.

Figure 2B:
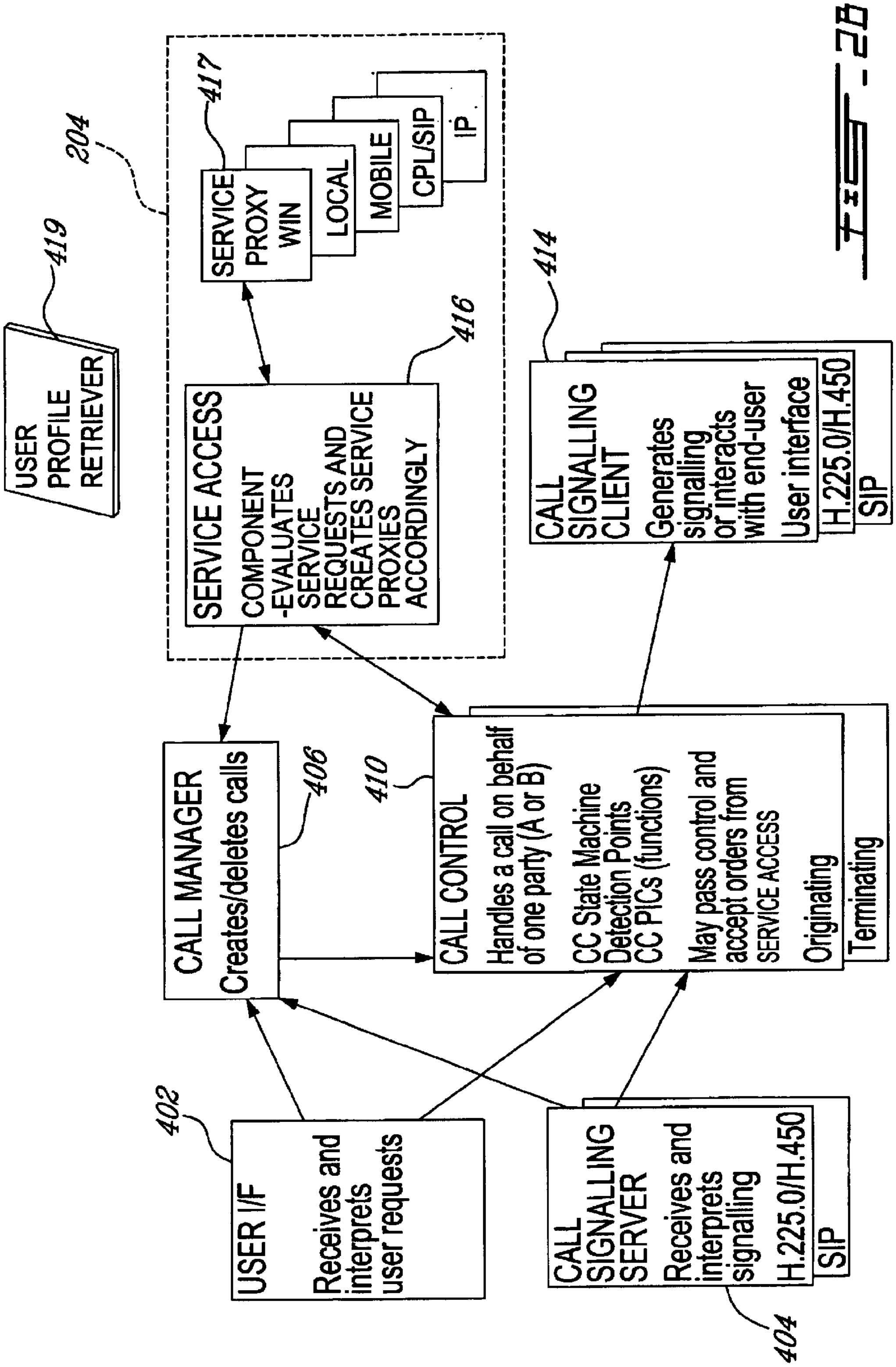
FIG. 2B depicts a functional block diagram of a VAS-enabled terminal which can interact with a user profile retriever in accordance with the teachings of the present invention.

Referring now to FIG. 2B, a functional block diagram of a VAS-enabled entity (e.g., an enhanced terminal) is shown therein for illustrating the various aspects of the call control and service access process described hereinabove. A user interface 402 is provided for interacting with the end-user. It accepts requests from the user (e.g., call initiation, call abandon, or call release), obtains necessary information to proceed (e.g., a phone number, authentication information, etc.), notifies the end-user about call-related events (e.g., another call attempt while a communication session is ongoing), and preferably potentially prompts the user for additional information (e.g., an authorization password) or call-related decisions (e.g., how to deal with other call attempts during an ongoing communication session).

A call signaling server 404 is provided for decoding, validating and interpreting call signaling messages received from other network entities. Preferably, it may also issue message confirmations, if required. In an H.323/H.450-based VoIP network embodiment, the call signaling server 404 receives messages from other H.323 entities such as, for example, a terminal, gateway, or a gatekeeper. These messages are defined by the H.225.0 specification, and may include a Supplementary Service (SS) message (in accordance with H.450.X Recommendation series) encapsulated therein. Accordingly, in this exemplary embodiment, the call signaling server 404 is provided with the capability to extract such encapsulated SS messages.

From the implementation standpoint, the call signaling server 404 may preferably be implemented as a dynamic library or as a separate software module. Furthermore, it may be combined with a call signaling client 414 associated therewith. Preferably, the call signaling client 414 translates call control intentions into appropriate signaling messages sent to other IP telephony entities. Similar to the call signaling server 404, the call signaling client 414 is preferably operable with multiple IP protocols, e.g., SIP, H.323, et cetera.

A call manager 406 is provided as a module that treats call setup requirements. In some exemplary embodiments, it also treats call release requests if they are not treated directly by the call control module 410. When an end-user initiates or ready to answer a call, and when the terminal or appliance is registered with a gatekeeper (in an exemplary H.323-based network embodiment), the call manager 406 requests access to the gatekeeper (for example, by using the Registration and Access Status (RAS) messages). If the access is granted, the call manager 406 creates an Originating or a Terminating call control 410, depending on whether the terminal is the originating or terminating party of the call. Thereafter, it passes the necessary information to the call control 410 (e.g., a calling party number, a called party number, etc.). When the call manager 406 is requested to complete or abandon a call, it preferably deletes the corresponding call controls also.

The call control 410 manages a call—from setup to termination—on behalf of one of the call parties (originating or terminating). A call party is characterized by the combination of the end-user and the terminal/appliance involved in the call. Accordingly, an Originating CCSM (O_CCSM) and a Terminating CCSM (T_CCSM) are provided for the call management. Where an H.323-based network is used, the CCSMs are preferably both H.323- and WIN-compliant in accordance with the teachings of the present invention. In analogous fashion, where a SIP-based network is used,.the CCSMs are SIP- and WIN-compliant. Preferably, as will be described in greater detail hereinbelow, the CCSMs (whether H.323-based or SIP-based) implement a Q.931 user-side-based state machine, augmented by WIN Detection Points (DPs—points in a call processing sequence where the processing may be suspended (because of the particular type of DP encountered) and control is passed to a Service Access component created in the Service Access server 204), Points in Calls (PICs—points in a call processing sequence where the call processing can be resumed), and additional states as may be needed.

Preferably, the call control 410 is started by the call manager 406. As to its termination, it may stop by itself or based on a decision by the call manager 406. When started, the primary task of the call control 410 is to obtain a list of the DPs to be armed. This list may be stored locally, or may be provided via a user profile retriever. Transitions in the CCSM of the call control 410 may result from the following:

- call signaling received from an IP entity via the call signaling server 404;
- input from the end-user via the user interface 402;
- result or request from the Service Access server;
- result of call control processing which preferably includes the following:
  - treatment of received call signaling; simple tasks may be performed locally, more complex ones may be delegated to other modules;
  - interactions with the end-user through the user interface 402, if needed; and
  - generation of call signaling.

As stated elsewhere, when the call control meets an armed DP, it may suspend processing based on the nature of the DP. If call processing is not stopped, the call control creates a suitable Service Access component and passes relevant information. Also, processing resumes (with a possible jump to a specified PIC) when the Service Access server answers, and according to the answer. In a presently preferred exemplary embodiment, when the call control 410 terminates for any reason, it may be required to notify the call manager 406 before doing so. Furthermore, the interaction between the services and the call control may be performed either directly (i.e., local services) or via a remote service proxy (e.g., WIN, remote services, CPL services).

Still continuing to refer to FIG. 2B, the VAS functionality of the enhanced terminal associated with a particular VAS implements the necessary logic required to execute the Value-Added Service that has been activated at network level and for the end-user. In the case of an H.450.X-compliant architecture, the VAS functionality implements H.450.X service-specific controls and may support one or more roles defined in the H.450.X Recommendations. It receives H.450 messages addressed to the role it supports in the H.450.X service, and may also generate H.450 messages to other H.323 entities. In some exemplary embodiments, the functionality may also impact an on-going call, either by interacting with the call manager 406 (e.g., to create or delete a call), or possibly with the call control 410 itself.

The Service Access server 204 (comprising the Service Access instance and service proxies) is provided as the intermediary between the call control 410 and the service logics. Preferably, it makes services and the manner they are accessed or implemented transparent to the call control 410. When a service needs to take place, the call control may suspend call processing depending on the DP's type and, if the processing is to be suspended, it creates a Service Access component as part of the Service Access server and passes control to it, together with relevant information about the ongoing call. The Service Access server 204 eventually passes the control back to the call control 410 with relevant service-related instructions. In a further exemplary embodiment, these instructions may require that the call manager 406 be accessed directly for some reason (e.g., termination of the call).

Depending upon the implementation of the IP telephony network and the service provisioning therein, the knowledge about the DPs may be gained in a variety of ways. For example, a user profile retriever 419 is provided that retrieves the current user/terminal profile from the user profile repository 168, shown in FIG. 1B. This profile includes a list of active triggers for the user/terminal combination, and therefore specifies the list of DPs to be armed. The user profile retriever 419 may retrieve this profile at start-up, or when explicitly requested by a client application and may be stored locally (possibly after retrieval of part or all of the profile information). In addition, the user profile may be directly accessed by the components which need them, i.e., call control, Service Access server (including the Service Access component, and possibly service proxies in some embodiments).

When the call control 410 passes control to the Service Access server 204 depending upon the type of an armed DP that is encountered, the Service Access component 416 created in connection therewith preferably evaluates if a service or services is/are to be executed, and if so, request for their execution, creates appropriate service proxies 417 accordingly. Thereafter, the Service Access server 204 answers the call control to resume the call process sequence as it has been doing (i.e., there is no service or no service has an immediate impact on the call).

Accordingly, as stated hereinabove, the call control 410 may not systematically stop call processing—instead, the nature of the DPs encountered determines this condition. If the on-going call is not to be stopped, the call control creates a suitable Service Access component and passes call information to it, but does not stop or wait for the answer therefrom.

In the context of service execution, the Service Access component 416 evaluates service requests and certain criteria associated therewith in order to decide if one or more triggers are to be generated. Preferably, the Service Access 416 evaluates these criteria in a pre-defined or pre-configured order so as to be able to generate the triggers and service requests as defined in the user profile (which may be potentially conflicting) in the right order. When a trigger has been generated and answered by a service or application node, the Service Access server preferably proceeds as follows:

If the service node asks to resume call processing and there is at least one more criterion left, the Service Access server evaluates that criterion.

If the service node's answer indicates resuming of the call control sequence at another PIC, the Service Access server commands the call control 410 to do so.

If there are no additional criteria to be evaluated, the Service Access server answers the call control 410 and stops processing. Preferably, the Service Access server stops its processing by answering the call control to resume the call process sequence as it has been doing (i.e., there is no service or no service has an immediate impact on the call).

As can be appreciated by those skilled in the art, there may be multiple call controls 410 provided at the same time (for example, where the end-user conducts several calls in parallel, or the terminal implements a proxy call control), wherein each call control process may require or encounter its own DP/DPs. Accordingly, a separate Service Access component may be created each time a new armed DP is encountered and, therefore, there can be several Service Access components for a single call.

Figure 2C:
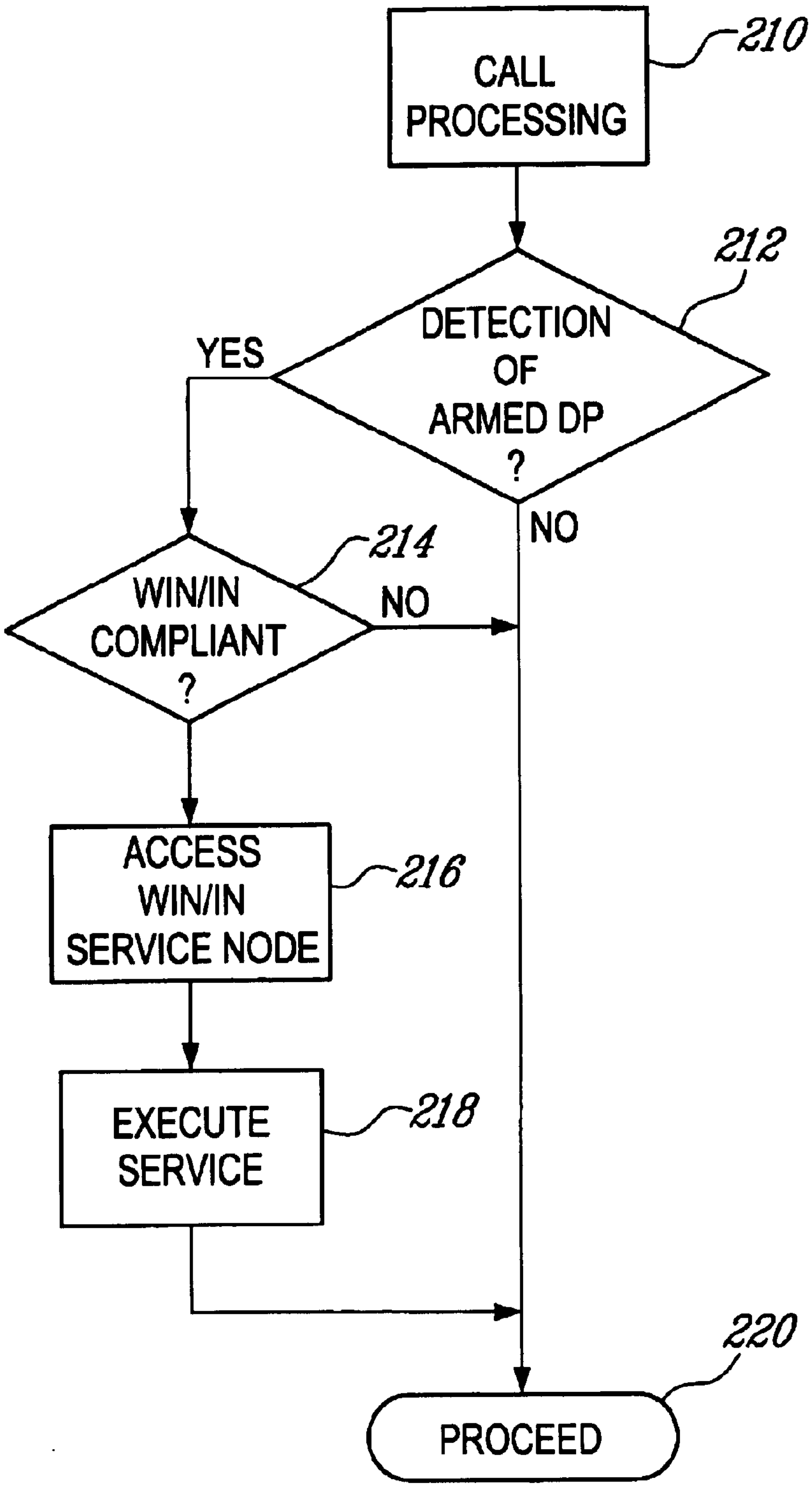
FIG. 2C depicts a flow chart of an exemplary embodiment of a service provisioning method for use in an integrated telecommunications network.

Referring now to FIG. 2C, shown therein is a flow chart of an exemplary embodiment of a service provisioning method which captures the essence of the interactions of the several modules of the VAS-enabled entity described above, which is capable of accessing service/application nodes, including WIN/IN-compliant nodes. As described in the foregoing sections, the CCSMs of the VAS-enabled entity are preferably provided with one or more DPs, that are preferably WIN/IN-specific. However, because some of the WIN/IN DPs are primarily cellular-network-oriented, and therefore not relevant to the CCSM of an IP entity, such DPs are not included in the call/connection control module of the entity. Also, some DPs are not applicable to terminals (IP or otherwise) and, therefore, are not included.

Accordingly, during a call processing step 210, when an armed DP is detected (decision block 212), a subsequent decision is made to verify if the DP is WIN/IN-compliant (decision block 214) requiring the creation of a suitable Service Access instance. Preferably, the information as to which DPs to be armed for a given end-user and terminal combination is accessed directly by the appropriate component i.e., call control, Service Access server (possibly including the service proxies). If no armed DP is detected, the call processing flow proceeds to subsequent steps which are typically implementation-specific (step 220). If the WIN/IN-specific DP is encountered, on the other hand, a new Service Access component is created as part of the Service Access server for accessing the appropriate service logic or logics in a service/application node (step 216). After the execution of the service logics, suitable answer or answers are provided to the Service Access server which determines the next step in the call processing sequence. These steps are comprehended in steps 218 and 220 of the flow chart.

Those of ordinary skill in the art should understand upon reference hereto that the determination of whether a DP is WIN/IN-compliant, shown in decision block 214, may preferably be avoided by a service provisioning method in some exemplary embodiments. Accordingly, it should be understood that it is not always necessary to check whether the DP is WIN/IN-compliant or not. Regardless, if the DP requires the creation of a Service Access instance and possible suspension of the call processing, it will be done accordingly.

Figure 2D:
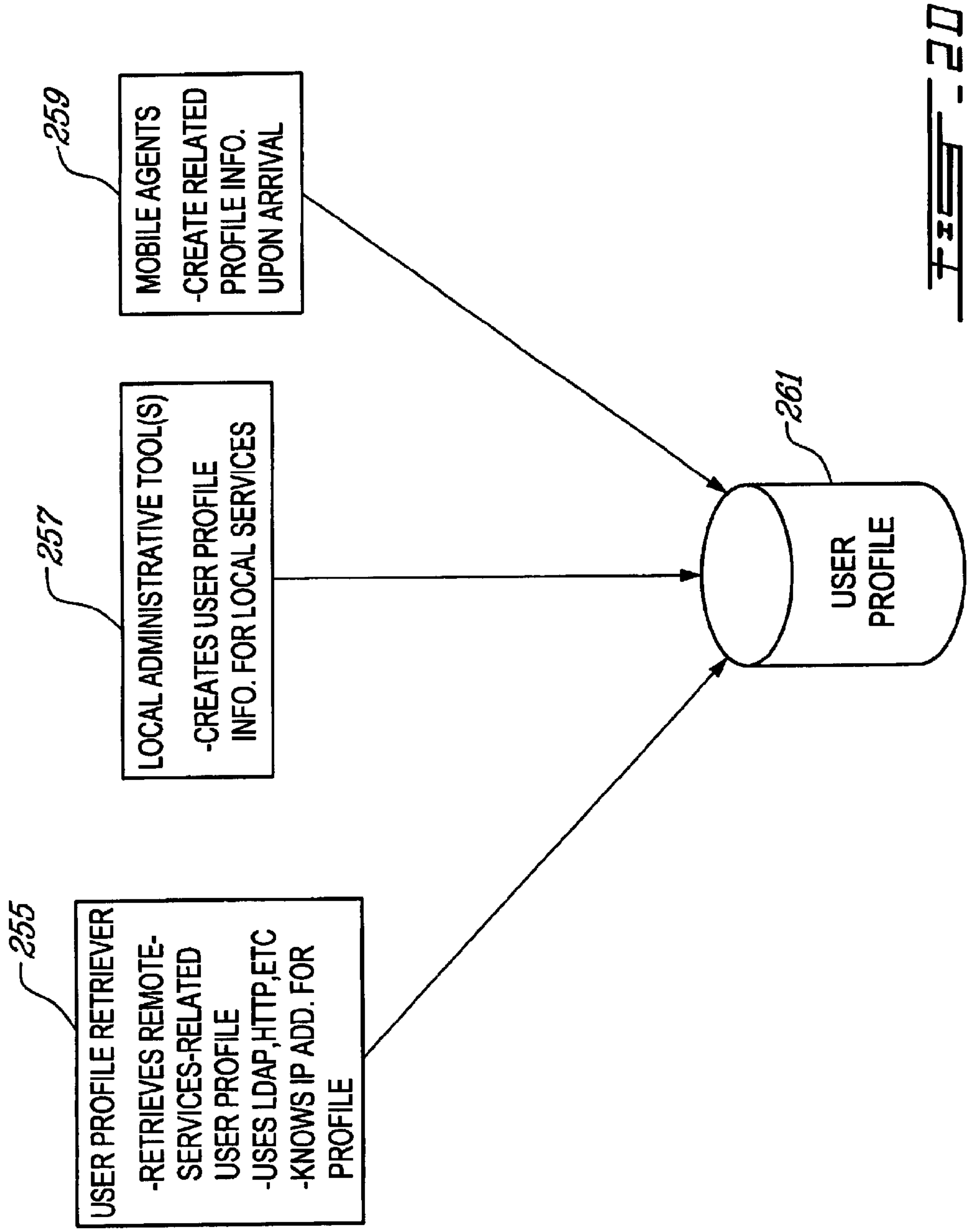
FIG. 2D depicts a generalized user profile model for use with a service invocation and realization architecture provided in accordance with the teachings of the present invention.

FIG. 2D depicts a generalized user profile model preferably used in conjunction with the universal service invocation and realization architecture depicted hereinabove with respect to FIG. 2A. It should be apparent to those skilled in the art that the implementations shown in FIGS. 1B and 1C illustrate particular embodiments (H.323-based) that are encompassed within the teachings of the generalized user profile model set forth herein.

As briefly stated in reference to FIGS. 2A and 2B, a user profile 261 (preferably utilized as the user profile repository 168 in FIGS. 1B and 1C or repository 318 in FIG. 3 described below) is preferably provided to be interfaced by the various components of the service invocation and realization architecture in order to invoke the appropriate services at the appropriate time. The user profile 261 preferably includes the DPs to be armed for both Terminating and Originating CCSMs. For each DP, a sequence is specified:

<condition of invocation>⇒condition based on call data and/or any other relevant data (e.g., date, time etc.). May also be TRUE if unconditional invocation.

<service type>⇒may be WIN, CPL Script, Local Service, Mobile Agent, etc.

<invocation information>⇒any relevant information for the invocation besides call data. For example, in the case of WIN, the trigger type, and the IP address for the SCP.

A user profile retriever 255 (which may preferably be utilized as the profile retriever 419 depicted in FIG. 2B) is provided for retrieving a user profile that is related to services. Preferably, an appropriate interface, e.g., LDAP, HTTP, etc., is used for this purpose. One or more local administrative tools 257 may be used for creating user profile information with respect to the local services of a subscriber. Services implemented as Mobile Agents 259 create appropriate related profile information upon arrival.

Taking FIGS. 2A and 2D together now, the components of the service invocation and realization architecture may further be described in terms of their universal functionality. Each time an armed DP is encountered, a Service Access (SA) instance (e.g., Service Access component 416 in FIG. 2B) is created with respect thereto depending on the DP's type. While the SA module has no knowledge of the actual services to be invoked, it possesses knowledge as to the service invocations and, once created, the SA instance may proceed to one or several service invocations or none at all. The SA determines which invocations are to be performed, their priority, and how such invocations need to be effectuated. Preferably, the user profile provides such knowledge, whereas actual invocations are delegated to specialized components.

Specialized service proxies (e.g., proxies 417 in FIG. 2B) are provided for implementing the specific aspects of different service environments. A Local Service Proxy may be provided for starting a local service and pass call parameters to it. Similarly, a Mobile Agent Proxy mediates between the call control and the mobile agent or mobile agency. A Local Script Proxy is provided for interpreting a service script (e.g., SIP CPL) and reporting its decision or decisions back to the call control. Also, an AS Proxy or WIN Proxy is provided for mediating between the call control and the external services.

As can be seen from the foregoing, services embodying a particular service logic environment may be local, remote, or mobile. Accordingly, services may access local or remote data. Further, a service may exist only for the time to answer the invocation associated therewith, or exist for the entire call or a part thereof. In addition, a service may have an immediate impact, deferred impact, or no impact on call control. In some instances, a service may not have any relevance with respect to call control at all. Preferably, services are provided with the capability to interact with the end-user and/or other applications.

Figure 3:
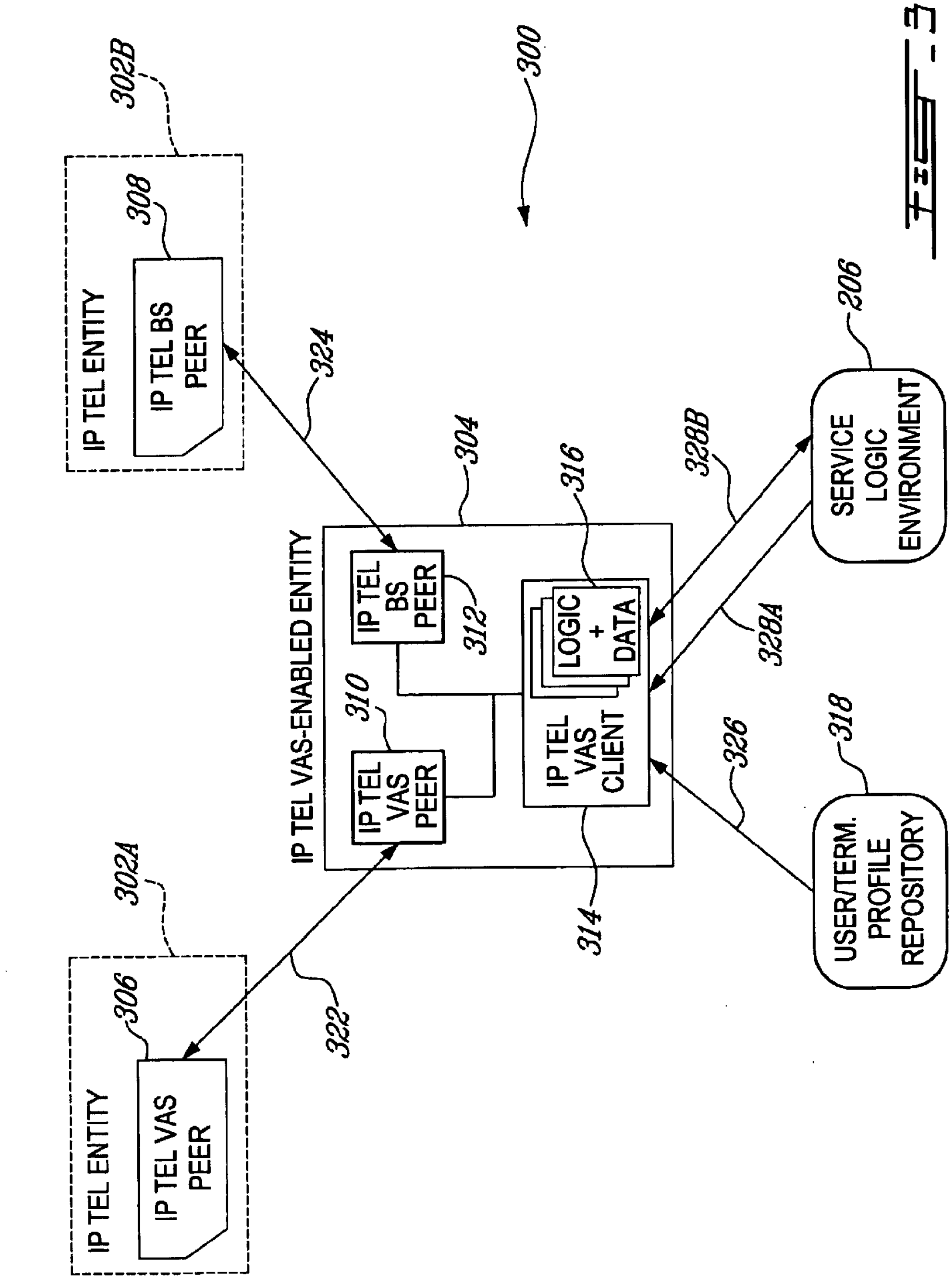
FIG. 3 depicts a functional block diagram of a VAS architecture provided in accordance with the teachings of the present invention.

Referring now to FIG. 3, shown therein is a functional block diagram of a VAS architecture 300 provided in accordance with the teachings of the present invention. The VAS architecture 300 includes IP telephony entities, e.g., IP TEL entity 302A and IP TEL entity 302B, VAS-enabled entities, e.g., IP TEL VAS-enabled entity 304, and VAS-specific entities.

The VAS-specific entities preferably encapsulate, or responsible for, the relatively volatile part of telephony services which includes the service logics and end-user profiles. The service logics and the way they interact together are determined by the service logic environment 206. Services may be added or removed on the fly, by the IP telephony service provider (TSP), a third-party service provider, or the end-user. They may be stored locally with respect to an IP TEL entity, remotely in a dedicated node (e.g., the service logic environment 206), or both. Appropriate logic and data 316 are included within an IP TEL VAS client 314 of the IP TEL VAS-enabled entity 304 for local service implementation.

The end-user-and-terminal combination profile, which includes the set of services activated for the end-user/terminal, may also be stored locally or remotely in a dedicated node (e.g., profile repository 318). In some implementations, both arrangements may co-exist. When disposed in a separate node, the profiles are retrieved by using a retrieval interface 326 implemented in, for example, HTTP. The access to the service logic environment 206 is implemented using a code mobility interface 328A and a service logic access interface 328B. The code mobility interface 328A, typically used for retrieving some service logic code or VAS client code from the service logic environment 206, may be effectuated using a Java RMI protocol or a Mobility Agent protocol. The service logic access interface 328B may be based on the following:

INAP/IP if the service logic environment 206 comprises a legacy IN or WIN SCP;

Corba or Java RMI if a programmatic interface is needed; or an ASCII/IP interface (e.g., similar to SIP).

The IP TEL entities are involved in the stable part of telephony services which typically consists of the set-up, control, and release of IP telephony calls. For supporting the processing and signaling related to this activity, an IP Basic Services (BS) peer 308 is provided within the IP TEL entities which, in exemplary embodiments, include IP terminals, H.323 gatekeepers, gateways, SIP proxy and/or redirect servers, et cetera. Optionally, an IP TEL entity may also take part in the execution of a VAS, that is, it may be able to generate or process some requests or notifications related to the service execution. An IP TEL VAS peer 306 is provided for effectuating such functionality. As an example, the IP TEL VAS peer 306 may be able to re-route a call setup request or may be notified that a call diversion has occurred.

An IP TEL entity may be VAS-enabled, e.g., entity 304, when it is also capable of determining which services should take place and when, and of taking the necessary measures to execute them using the IP TEL VAS client 314 that is connected to the volatile VAS-specific entities via the interfaces described above. The VAS-enabled entity 304 also includes its own VAS peer 310 and BS peer 312 for interfacing with other IP TEL entities.

Figure 4:
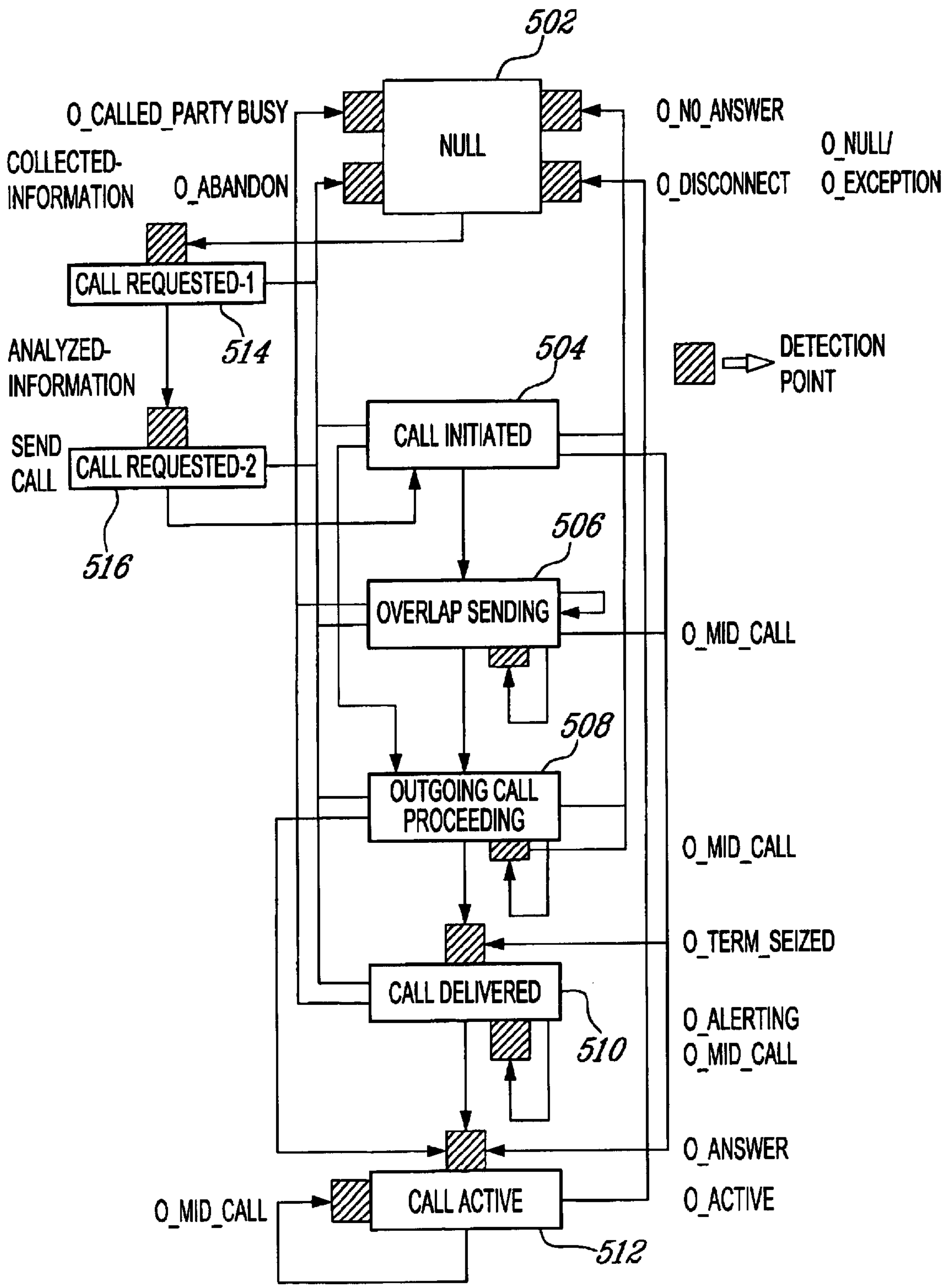
FIG. 4 depicts a WIN-compliant Originating Call Control State Machine (O_CCSM) for use with an H.323 terminal or a SIP terminal.
Figure 5A:
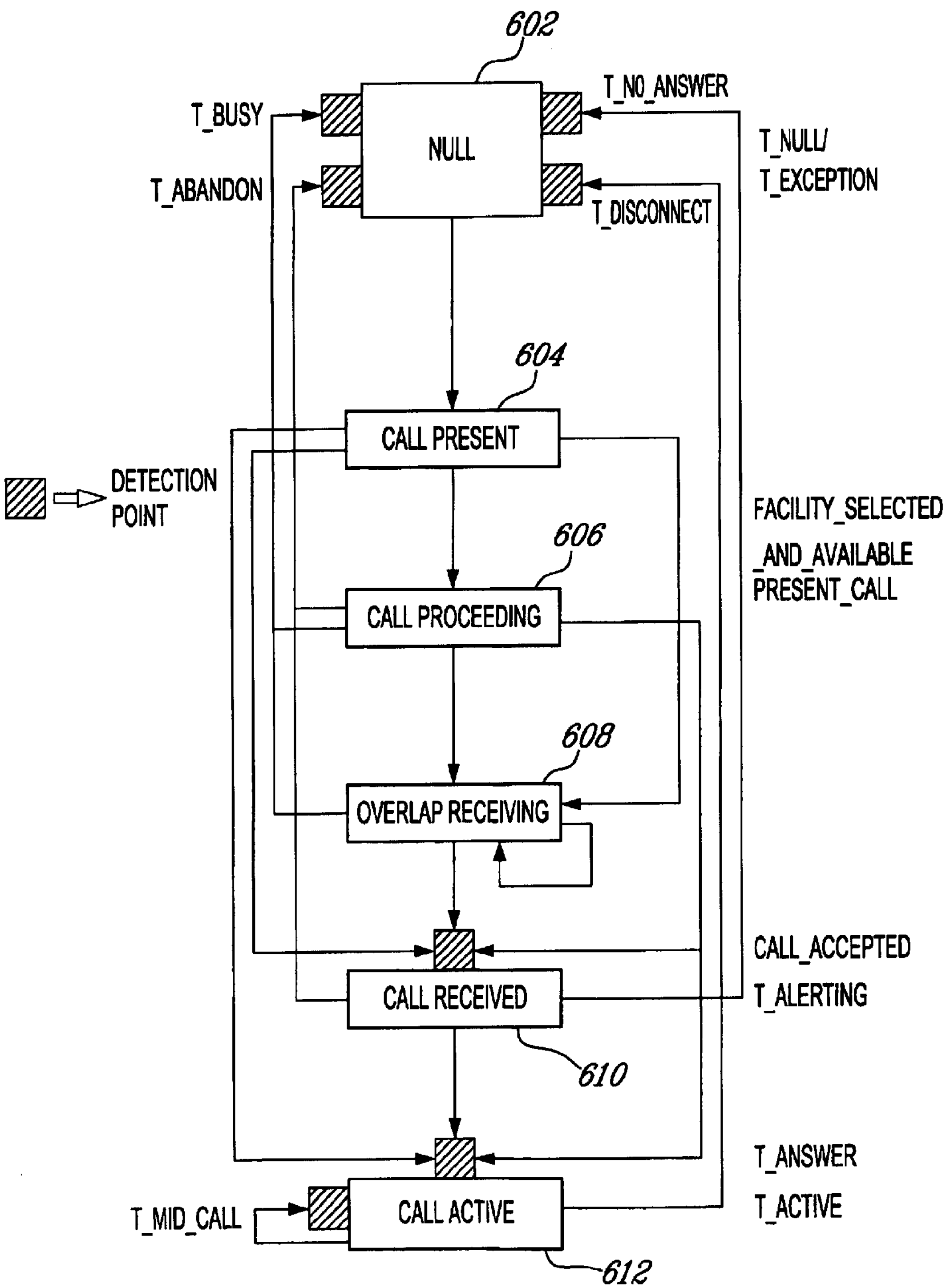
FIG. 5A depicts a WIN-compliant Terminating Call Control State Machine (T_CCSM) for use with an H.323 terminal.
Figure 5B:
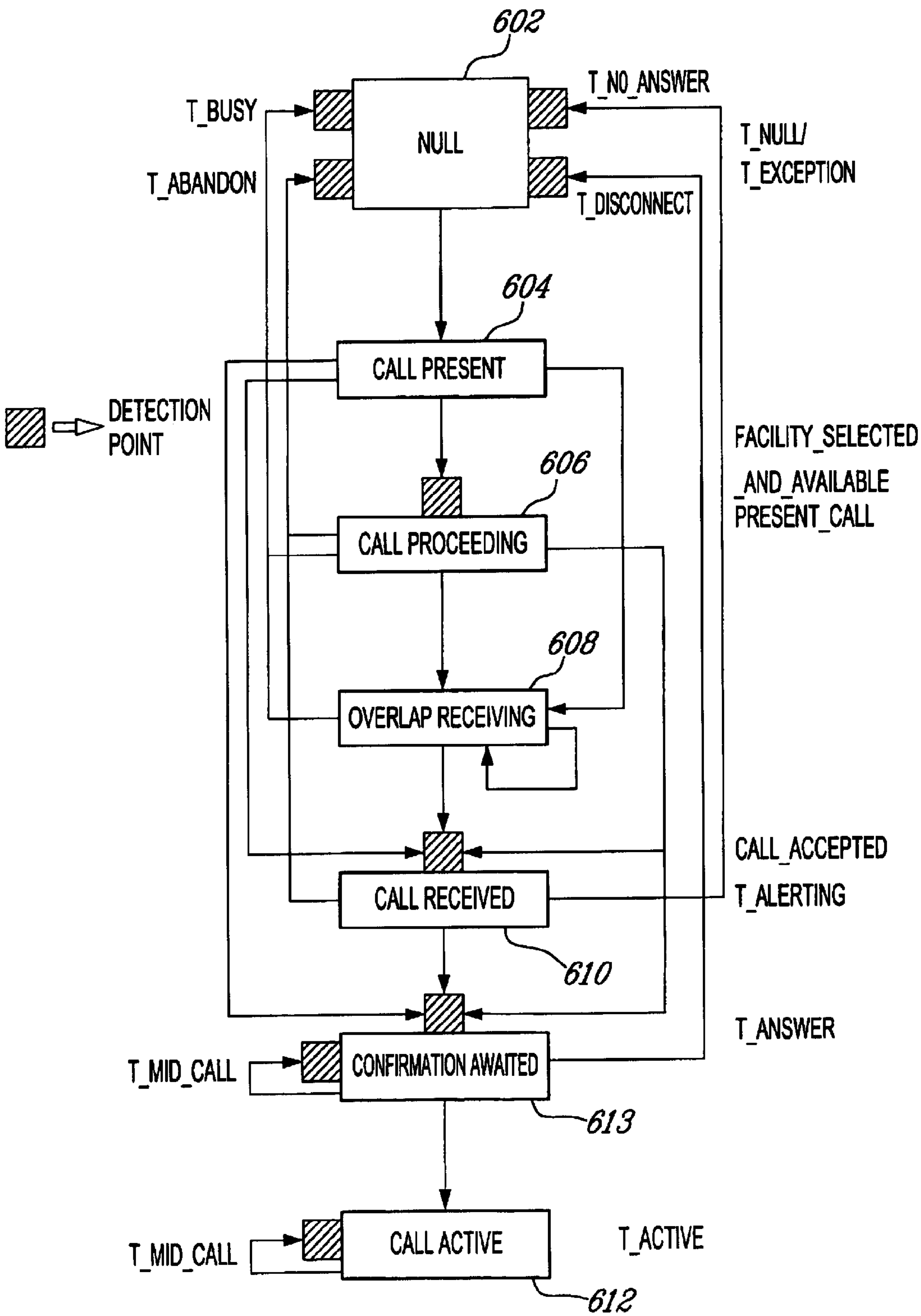
FIG. 5B depicts a WIN-compliant Terminating Call Control State Machine (T_CCSM) for use with a SIP terminal.

FIG. 4 depicts a WIN-compliant O_CCSM for use with an H.323 or SIP terminal in accordance with the teachings of the present invention. FIG. 5A depicts a WIN-compliant T_CCSM for use with an H.323 terminal. And, FIG. 5B depicts a WIN-compliant T_CCSM for use with a SIP terminal. As stated hereinabove, the CCSMs of the present invention are preferably based on the Q.931 user-side protocol originating and terminating state machines. These state machines are then rendered WIN-compliant by modifying according to the WIN originating and terminating Basic Call State Models (BCSMs), which add DPs and PICs at specific locations with the CCSM. Some WIN DPs and PICs are not retained in the terminal CCSMs because they are network-specific or not supported in the H.323 standard.

The O_CCSM for an IP terminal (H.323 or SIP terminal) is depicted in FIG. 4. Each of the states and associated DPs and PICs are described below.

1. Null (State 502)

Entry Event:

Call is abandoned or cleared by the end-user (User Interface) (DP: O_Abandon or O_Disconnect)

Call is abandoned or cleared by network or called party (Release Complete) (DP: O_Abandon or O_Disconnect)

Called party does not answer the call (Release Complete or Timeout) (DP: O_No_Answer)

Called party is busy (Release Complete) (DP: O_Called_Party_Busy)

Exception handling

PIC: O_Null and O_Exception

Functions:

If the call has been abandoned or cleared by the end-user, issue a disconnect (Call Release), notify end-user, notify call manager and terminate If the call had been abandoned or cleared by the called party, notify end-user, notify call manager and terminate If the called party is busy or does not answer, notify end-user, notify call manager and terminate If exception handling, process exception, notify end-user, notify call manager and terminate Exit Event:

Called party number/address is provided (DP: Collected_Information)

Call is abandoned by end-user (DP: O_Aandon)

2. Call Requested-1 (State 514)

Entry Event:

Called party number/address is available (DP: Collected_Information)

PIC: Analyzed_Information

Functions:

None

Exit Event:

Call is abandoned by end-user (DP: O_Abandon)

Automatic transition (DP: Analyzed_Information)

3. Call Requested-2 (State 516)

Entry Event:

No event required

PIC: Send_Call

Functions:

Issue a call setup request (SETUP)

Exit Event:

Call is abandoned by end-user (DP: O_Abandon)

Call setup request has been successfully issued

4. Call Initiated (State 504)

Entry Event:

Call setup request has been successfully issued

PIC: No PIC

Functions:

Sets timer and waits for event

Exit Event:

Answer indicating that the called party is processing the call request (Call Proceeding)

Answer indicating that the called party user is being alerted (Alerting) (DP: O_Term_Seized)

Answer indicating that the called party user has answered the call (Connect) (DP: O_Answer)

Answer indicating that the called party is busy (Call Release) (DP: O_Called_Party_Busy)

Answer indicating that the called party refuses the call (Call Release) (DP: O_Abandon)

Answer indicating that the called party requires more setup information (Setup Acknowledge)

Timeout (DP: O_No_Answer)

Call is abandoned by end-user (DP: O_Abandon)

5. Overlap Sending (State 506)

Entry Event:

Answer indicating that the called party requires more setup information (Setup Acknowledge)

PIC: No PIC

Functions:

Acquire necessary information (preferably via interaction with end-user) and send it (Information)

Exit Event:

Answer indicating that the called party is processing the call request (Call Proceeding)

Answer indicating that the called party user is being alerted (Alerting) (DP: O_Term_Seized)

Answer indicating that the called party user has answered the call (Connect) (DP: O_Answer)

Answer indicating that the called party is busy (Call Release) (DP: O_Called_Party_Busy)

Answer indicating that the called party refuses the call (Call Release) (DP: O_Abandon)

Answer indicating that the called party requires more setup information (Setup Acknowledge)

Call is abandoned by end-user (DP: O_Abandon)

End-user requests a feature (DP: O_Mid_Call)

Timeout (DP: O_No_Answer)

6. Outgoing Call Proceeding (State 508)

Entry Event:

Answer indicating that the called party is processing the call request (Call Proceeding)

Functions:

Notify the end-user that the setup request has been answered

Set timer and wait for event

Exit Event:

Answer indicating that the called party user is being alerted (Alerting) (DP: O_Term_Seized)

Answer indicating that the called party user has answered the call (Connect) (DP: O_Answer)

Answer indicating that the called party is busy (Call Release) (DP: O_Called_Party_Busy)

Answer indicating that the called party refuses the call (Call Release) (DP: O_Abandon)

Timeout (DP: O_No_Answer)

Call is abandoned by end-user (DP: O_Abandon)

End-user requests a feature (O_Mid_Call)

7. Call Delivered (State 510)

Entry Event:

Answer indicating that the called party user is being alerted (Alerting) (DP: O_Term Seized)

PIC: O_Alerting

Functions:

Notify the end-user that the called party is being alerted

Wait for event

Exit Event:

Answer indicating that the called party user has answered the call (Connect) (DP: O_Answer)

Answer indicating that the called party is busy (Call Release) (DP: O_Called_Party_Busy)

Answer indicating that the called party refuses the call (Call Release) (DP: O_Abandon)

Call is abandoned by end-user (DP: O_Abandon)

End-user requests a feature (O_Mid_Call)

8. Call Active (State 512)

Entry Event:

Answer indicating that the called party user has answered the call (Connect) (DP: O_Answer)

PIC: O_Active

Functions:

Notify session manager (H.245) that the call is active

Wait for event

Exit Event:

End-user requests a feature (DP: O_Mid_Call)

End-user clears the call (DP: O_Disconnect)

Receives disconnect message from network or called party (Call Release) (DP: O_Disconnect)

FIG. 5A depicts an H.323 terminal's T_CCSM in particular detail. Each of the states shown therein and associated DPs and PICs are described below.

1. Null (State 602)

Entry Event:

Call is abandoned or cleared by calling party or network (Call Release) (DP: T_Abandon or T_Disconnect)

Call is abandoned or cleared by end-user (User Interface)

(DP: T_Abandon or T_Disconnect)

End-user does not answer the call (User Interaction Timeout) (DP: T_No_Answer)

End-user is busy (communication appliance is busy or end-user says so) (DP: T_Busy)

Exception handling

PIC: T_Null and T_Exception

Functions:

If call is abandoned or cleared by calling party or network, notify end-user, notify call manager, and terminate If the call has been abandoned or cleared by the end-user, issue a disconnect (Call Release), notify end-user, notify call manager and terminate If end-user does not answer the call, issue disconnection request (Call Release), notify call manager and terminate If exception handling, process exception, notify end-user, notify call manager and terminate Exit Event:

An indication of incoming call has been received (Setup)

(DP: Facility_Selected_and_Available)

2. Call Present (State 604)

Entry Event:

An indication of incoming call has been received (Setup)

PIC: Present_Call

Functions:

In case no more information is required, issue a corresponding indication (Setup Acknowledge)

Otherwise, unless the end-user has decided otherwise, issue an indication that the setup request has been received (Call Proceeding)

If the end-user has explicitly stated to do so, alert the end-user and issue and altering indication (Alerting)

If the end-user has explicitly stated to do so, directly accept the call by issuing a corresponding indication (Connect)

If the end-user has explicitly-stated to do so, directly reject the setup by issuing a corresponding indication (Call Release)

Exit Event:

A call proceeding indication has been issued (DP: Facility_Selected_and_Available)

An alerting indication has been issued (DP: Call_Accepted)

A connect indication has been issued (DP: T_Answer)

A call release indication has been issued (DP: T_No_Answer)

A call release indication has been received (DP: T_Abandon)

3. Call Proceeding (State 606)

Entry Event:

A call proceeding indication has been issued

PIC: Present_Call

Functions:

Present the call to the end-user and set a short timer

If the end-user cannot be contacted, issue a busy indication (Call Release)

Otherwise, if the end-user answers the call before the timeout, issue an indication that the call is accepted (Connect)

Otherwise, issue an indication that the end-user is being alerted (Alerting)

Exit Event:

A call release indication has been issued (DP: T_Busy)

An indication that the end-user is being alerted has been issued (DP: Call_Accepted)

An indication that the call is answered has been issued (DP: Call_Answered)

A call release indication has been received (DP: T_Abandon)

4. Overlap Receiving (State 608)

Entry Event:

A setup acknowledge indication has been issued

An Information message has been received

PIC: No PIC

Functions:

Wait for an Information message

Analyze the information

If still not enough, issue another Setup Acknowledge indication

In enough information has been received, present the call to the end-user

If the end-user cannot be contacted, issue a busy indication (Call Release)

Otherwise, issue and indication that the end-user is being alerted (Alerting)

Exit Event:

An Information message has been received

A call release indication has been issued (DP: T_Busy)

An indication that the end-user is being alerted has been issued (DP: Call_Accepted)

An indication that the call is answered has been issued (DP: Call_Answered)

A call release indication has been received (DP: T_Abandon)

5. Call Received (State 610)

Entry Event:

An indication that the end-user is being alerted has been issued (DP: Call_Accepted)

PIC: T_Alerting

Functions:

Set a timer and wait for a response from the end-user

If the end-user answers the call, issue a corresponding indication (Connect)

If the end-user refuses the call, issue a corresponding location (Call Release)

After timeout, issue an indication that the end-user does not answer (Call Release)

Exit Event:

A call release has been issued (DP: T_No_Answer)

A call release has been received (DP: T_Abandon)

A connect indication has been issued (DP: T_Answer)

6. Call Active (State 612)

Entry Event:

A connect indication has been issued

PIC: T_Active

Functions:

Notify session manager (H.245) that the call is active

Wait for event

Exit Event:

End-user requests a feature (DP: T_Mid_Call)

End-user clears the call (DP: T_Disconnect)

Receives the disconnect message from network or called party (Call Release) (DP: T_Disconnect)

FIG. 5B depicts a SIP terminal's T_CCSM in particular detail. It should be realized that the SIP terminal's T_CCSM is substantially similar to that of the H.323 terminal described in greater detail above. Accordingly, only the salient differences therebetween are set forth below.

Essentially, a new state, state 613, is added in the T_CCSM of a SIP terminal.

7. Confirmation Awaited (State 613)

Entry Event:

A connect indication has been issued

PIC: None

Functions:

Notify session manager that a confirmation of the call setup is awaited

Wait for event

Exit Event:

Confirmation of the call setup has been received from the calling party (DP: T_Mid_Call)

End-user clears the call (DP: T_Disconnect)

Receives the disconnect message from network or called party (Call Release) (DP: T_Disconnect)

In addition, it should also be noted that the DPs and PICs associated with the Call Active state, which is now entered from the Confirmation Awaited state, are is appropriately modified. Also, no specific entry event is required for this state.

Figure 6A:
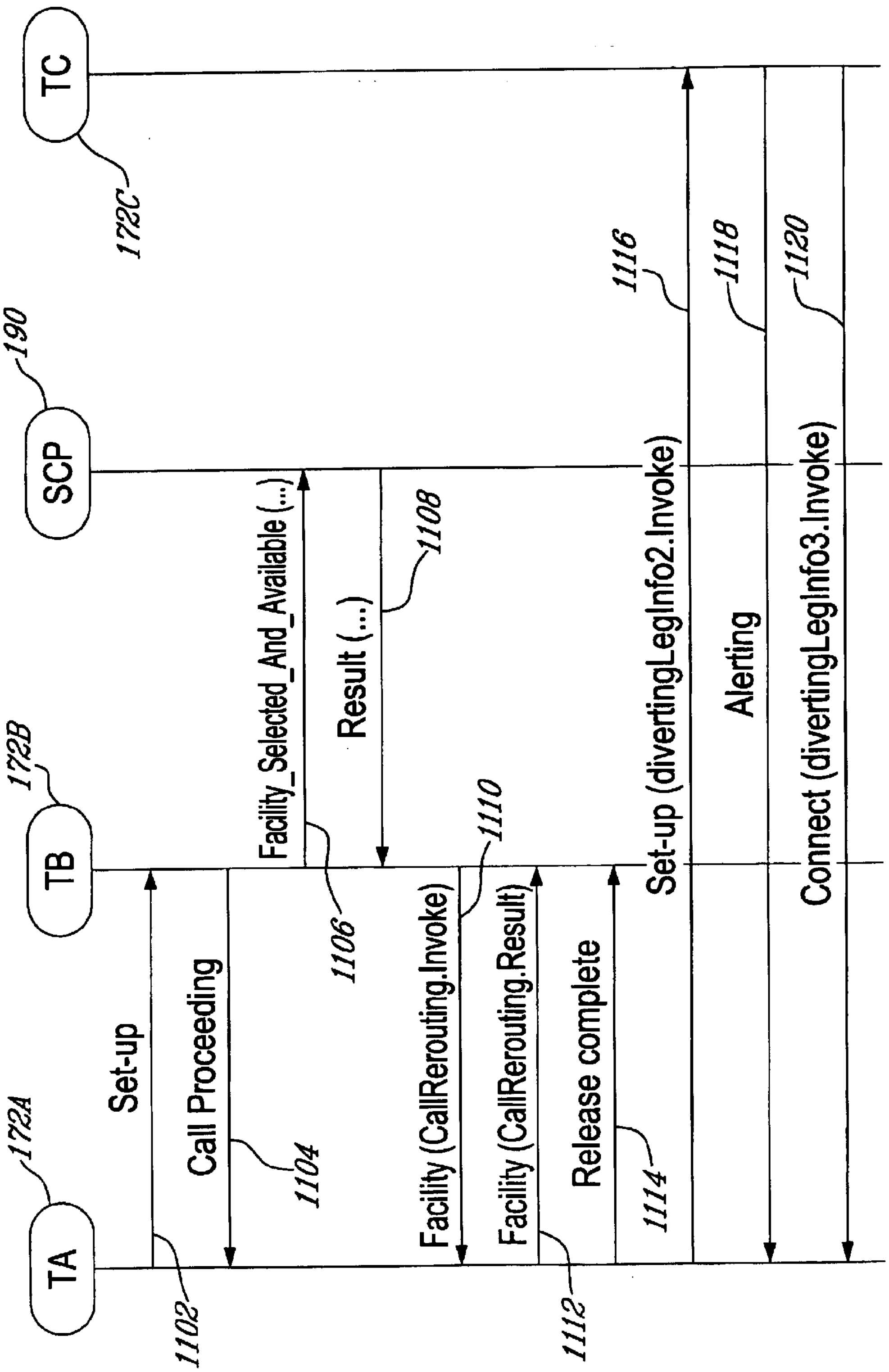
FIGS. 6A and 6B depict message flow diagrams for two exemplary embodiments of a call diversion service, respectively, in accordance with the teachings of the present invention.
Figure 6B:
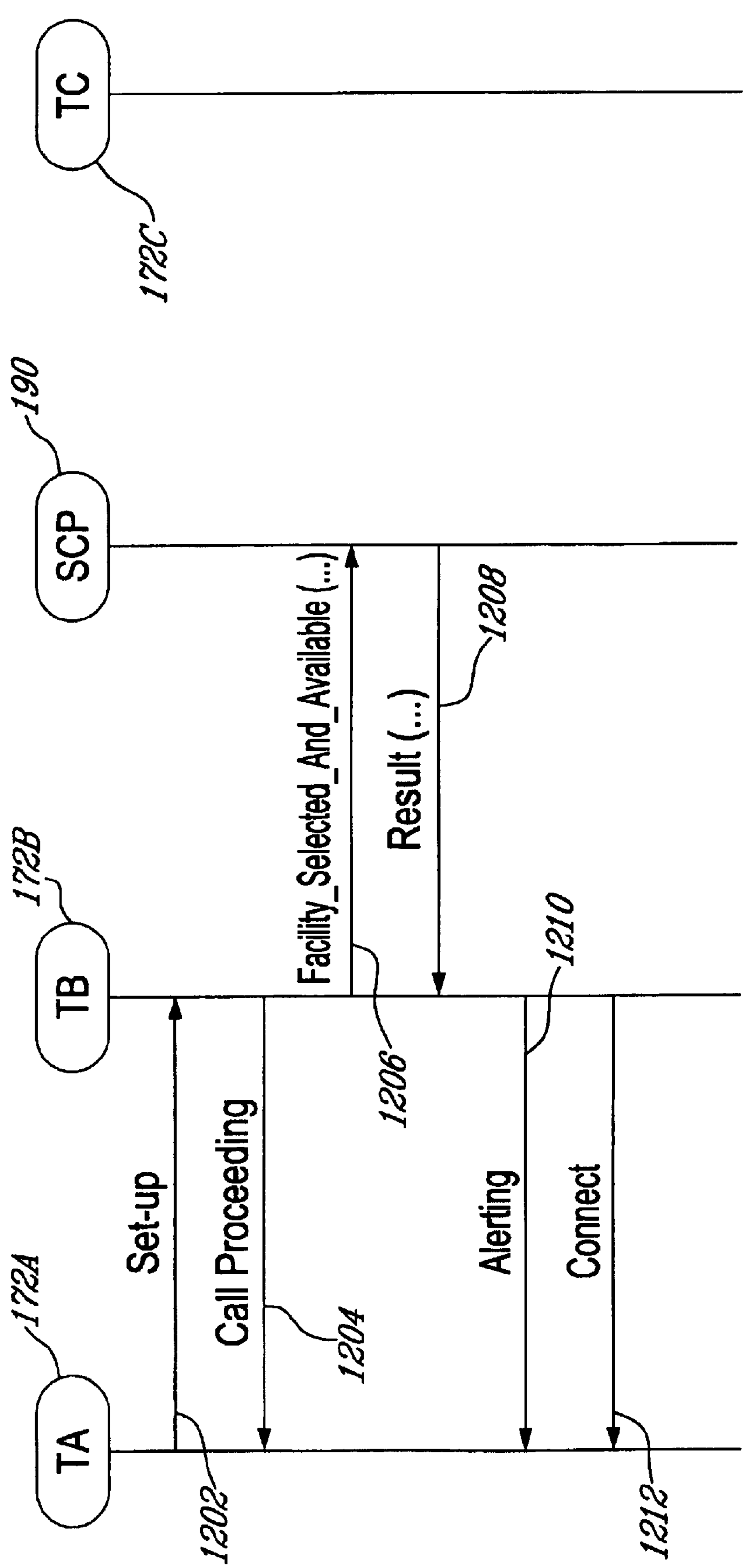

FIGS. 6A and 6B depict message flow diagrams for two exemplary embodiments of a call diversion service, respectively, in accordance with the teachings of the present invention. While it is well-known, the H.323/H.450 framework supports several "flavors" of call diversion (SS-DIV flavors, for example, Call Forward Unconditional (SS-CFU), Call Forward Busy (SS-CFB), and Call Forward No Reply (SS-CFNR)), there is no provision for a time-dependent Call Forward service. FIGS. 6A and 6B illustrate how the existing H.450 services may be enhanced or extended by using the teachings of the present invention.

Referring in particular to FIG. 6A, a message flow diagram of an exemplary embodiment of a time-dependent Call Forward service is shown therein. When terminal-1 172A (TA) issues a Call Setup request 1102, terminal-2 172B (TB) responds by a Call Proceeding message 1104, indicating that TB will subsequently answer the request. Thereafter, TB's T_CCSM encounters an armed DP (Facility_Selected_and_Available) and generates a corresponding trigger 1106 to the SCP 190. Pursuant to the DP, the call control is passed to the SCP 190 which provides an appropriate Result 1108. The SCP 190 is aware that a Call Forward service dependent on date and time has been set up for the subscriber/TB combination and that the call should be diverted to terminal-3 172C (TC). The Result 1108 from the SCP 190 contains the appropriate instruction for the call diversion.

Responsive to the Result 1108 from the SCP 190, TB issues towards TA 172A an H.225.0 Facility message 1110, including an encapsulated H.450.3 Call Re-Routing Invoke request. TA 172A accepts the request by issuing an acknowledgment message (Facility) 1112 and releases the call by sending a Release Complete message 1114 to TB 172B.

Thereafter, TA 172A issues a Call Setup message 1116 to TC 172C, with an H.450.3 field indicating that the call has been re-routed from TB 172B. TC 172C directly informs TA that the subscriber is being alerted by issuing an Alerting message 1118. Once the subscriber answers the call, a Connect message 1120 is sent from TC to TA.

The message flow diagram depicted in FIG. 6B illustrates a variation on the time-dependent Call Forward service described above. It can be readily seen that the messages are essentially similar and, accordingly, only the salient features are set forth below.

Once the T_CCSM of TB 172B encounters the armed DP (Facility_Selected_and_Available), the call control is passed to the SCP 190 which is aware that the a Call Forward service dependent on date and time has been activated for the subscriber/terminal-2. If, for some reason, the call should not be diverted at the selected date/time, TB is instructed to resume normal call processing, by sending an appropriate Result 1208 thereto. Thereafter, TB instructs TA that the subscriber is being alerted (Alerting 1210) and that the call is established (via a Connect message 1212).

Figure 7:
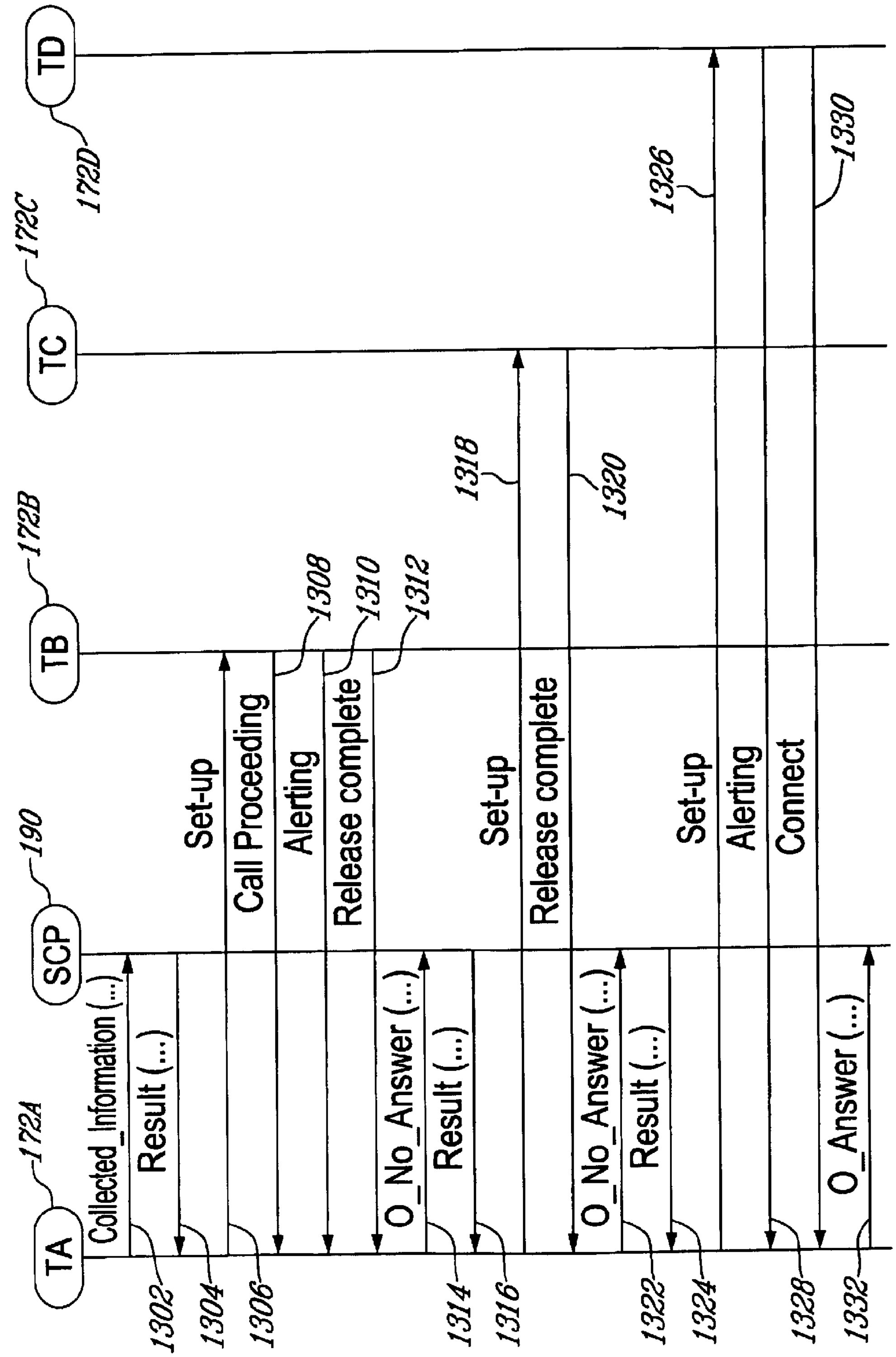
FIG. 7 depicts a message flow diagram for a hunt group service in accordance with the teachings of the present invention.
Figure 8A:
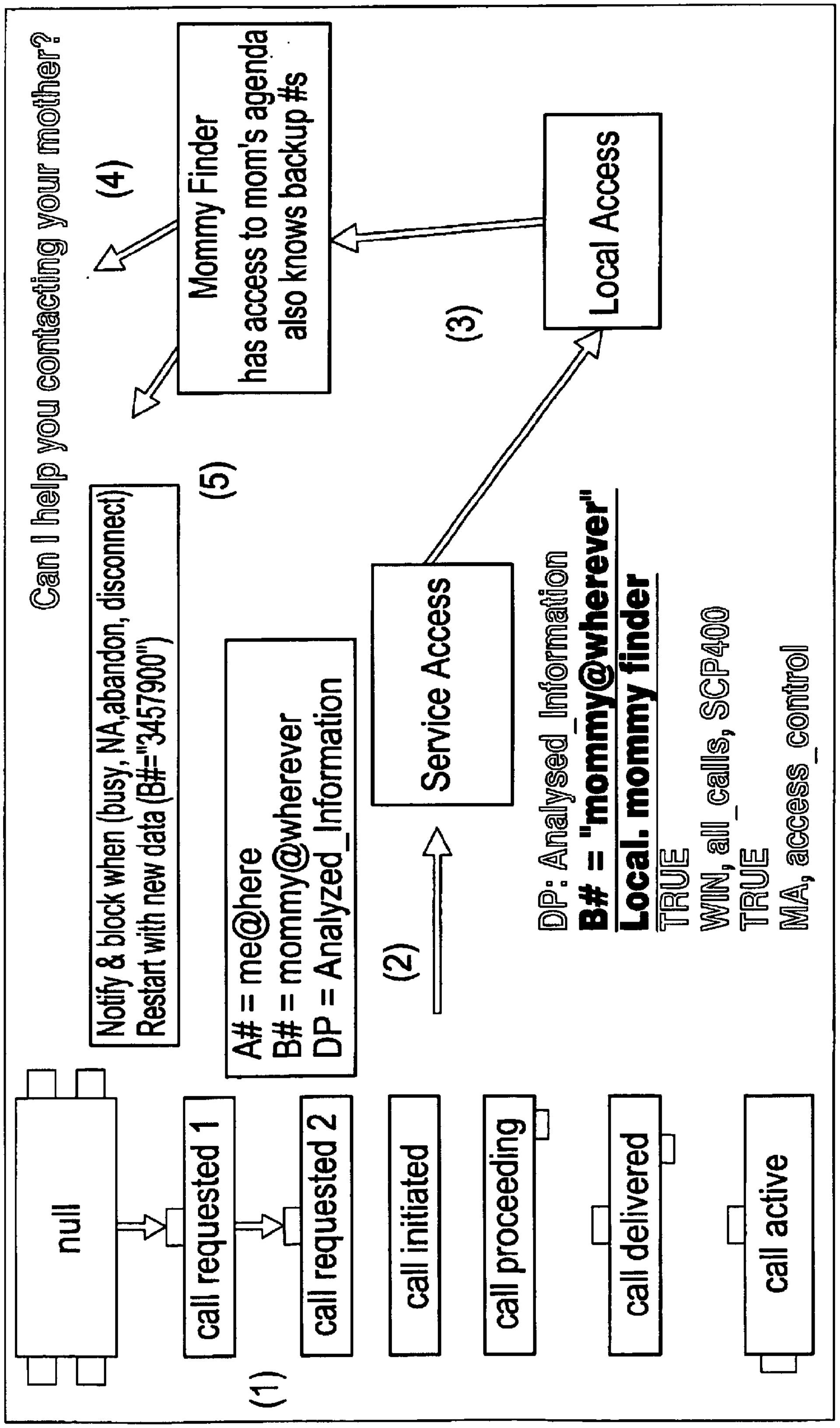
FIGS. 8A–8F depict examples of service invocation and realization in accordance with the teachings of the present invention.
Figure 8B:
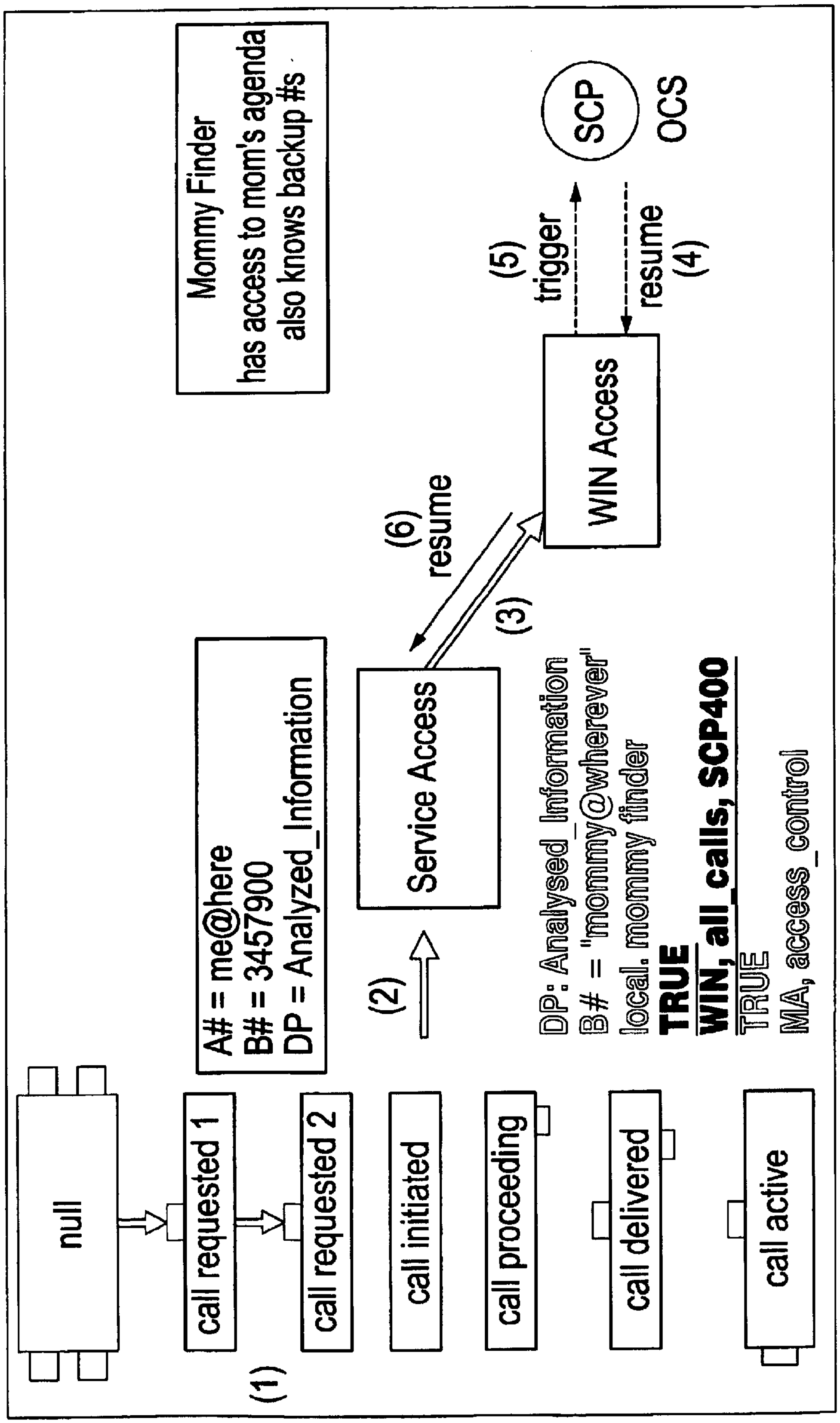
Figure 8C:
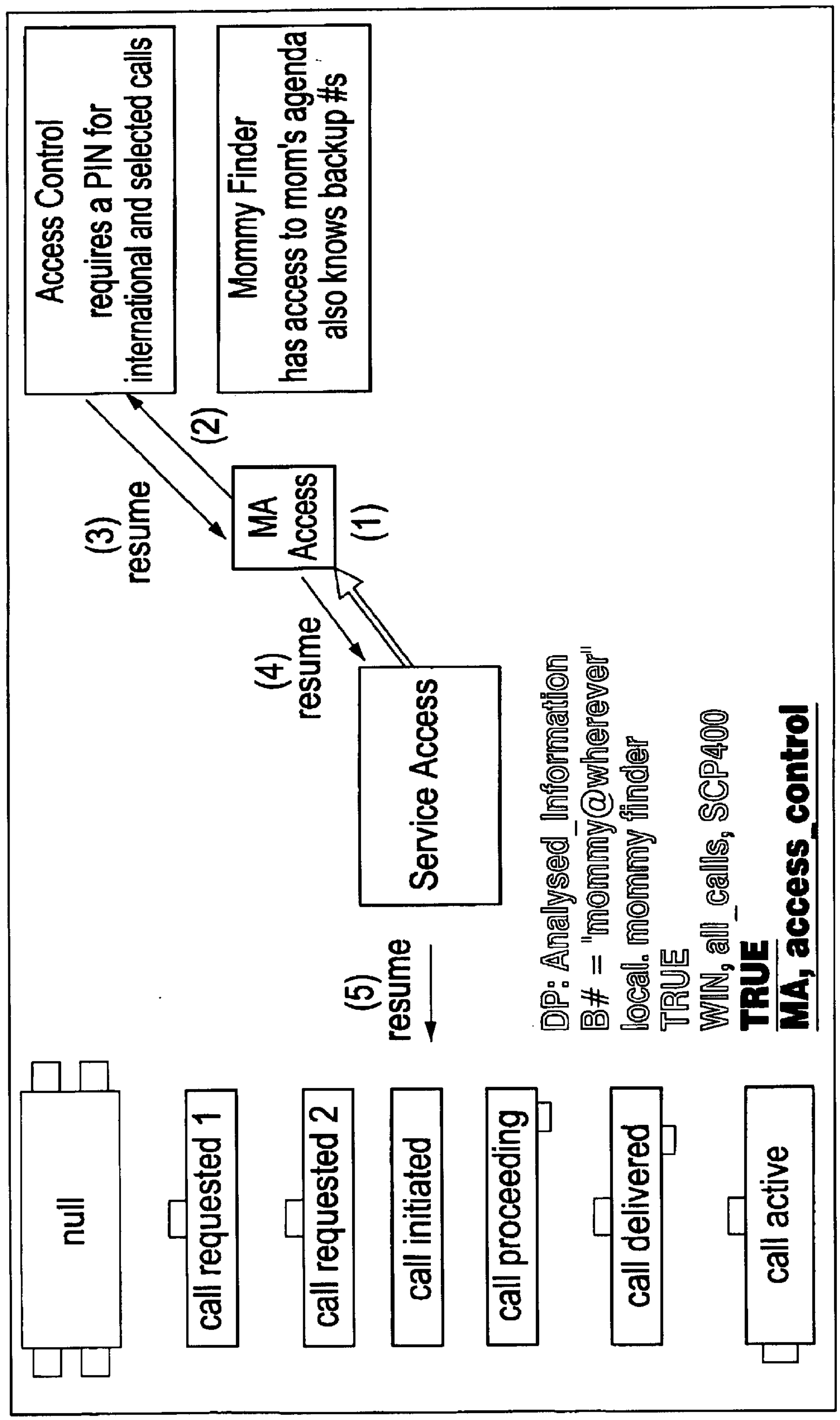
Figure 8D:
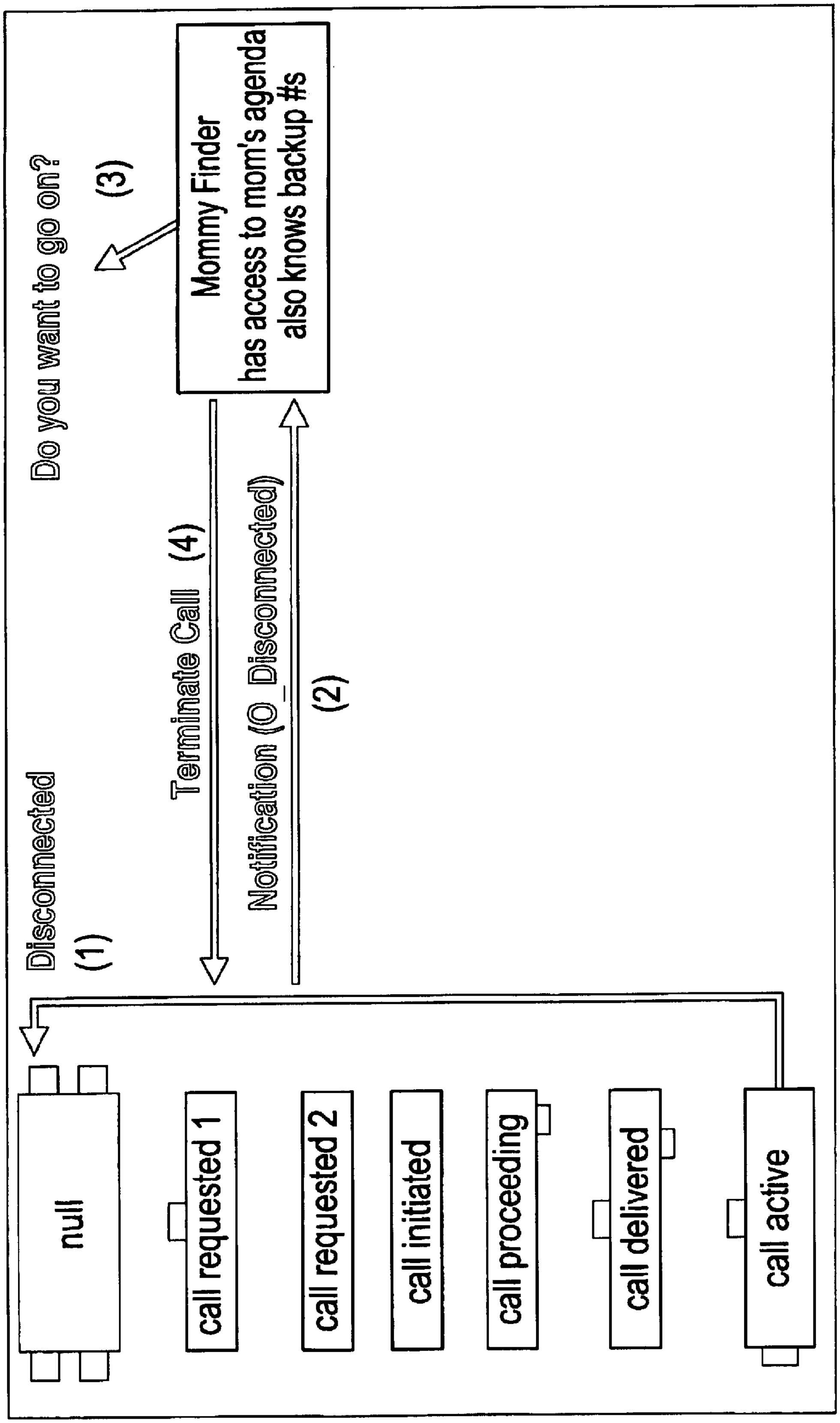
Figure 8E:
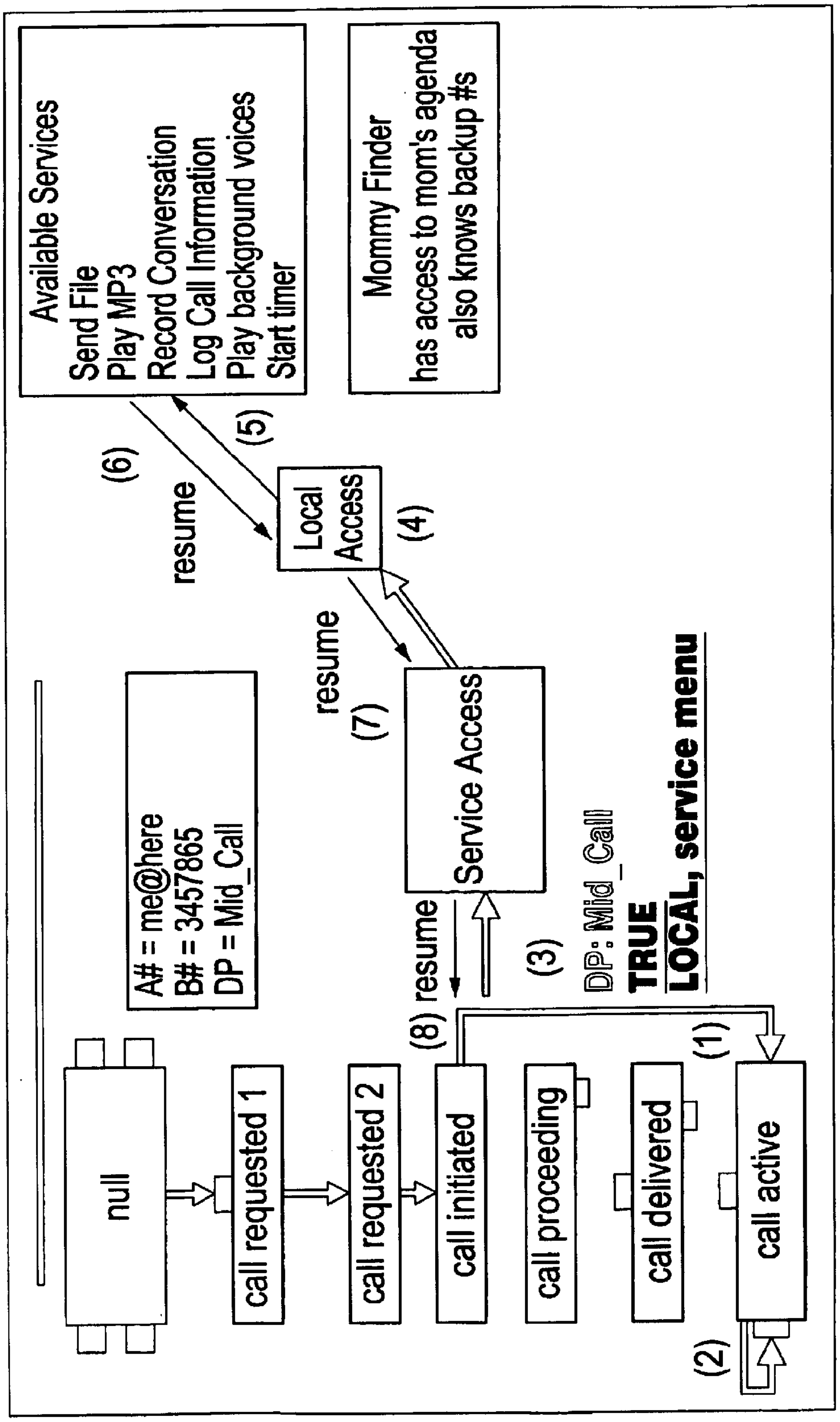
Figure 8F:
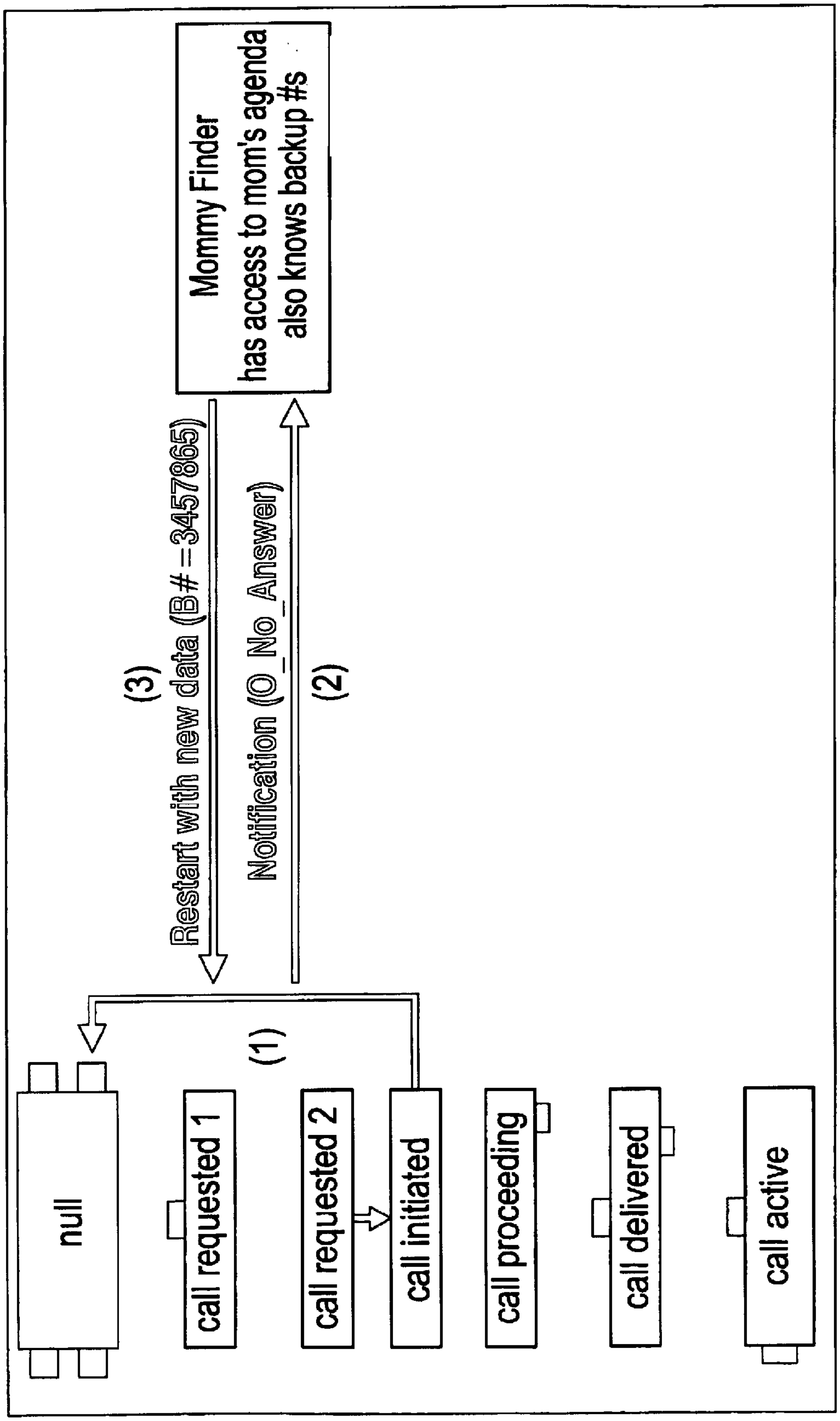

FIG. 7 depicts a message flow diagram for an exemplary embodiment of a hunt group service provided in accordance with the teachings of the present invention. When the end-user, TA 172A, requests for a Call Setup, providing as number the identification of a Virtual Private Network (VPN) group, the O_CCSM of TA 172A stops upon encountering armed Collected_Information and Analyzed_ Information DPs and a trigger is provided to the SCP 190. Responsive thereto, the SCP 190 determines that a hunt group service is to be executed. That is, a call setup must be attempted with a list of the terminating parties, in a pre-defined order, until one of them eventually answers the call. In one embodiment, the SCP 190 may simply provide the list of numbers to TA 172A and stop, provided TA 172A is VASenabled to handle such a list and execute the associated logic. In an alternative embodiment, the SCP 190 may instruct the terminal step-by-step as to what needs to be done. The message flow diagram in FIG. 7 contemplates this alternative scheme.

When the control is passed to the SCP via trigger 1302 on account of the armed DP, the SCP 190 instructs TA 172A (via Result 1304) to set up a call with TB 172B, and dynamically arms the following DPs: O_No_Answer, O_Called_Party_Busy, and O_Answer. Thereafter, TA 172B sends a call setup request 1306 to TB 172B. A Call Proceeding message 1308 is issued to TA 172A, indicating that TB will subsequently answer the request. TB alerts the end-user (Alerting 1310), but nobody answers the call. As a consequence, TB issues a Call Release Complete message 1312 indicating that there is no answer to the call setup attempt by TA 172A. The O_CCSM of TA encounters the O_No_Answer DP and issues a corresponding event 1314 to the SCP 190. The SCP 190 then proceeds to the next number in the hunt group list, re-requests (via result 1316) the terminal (TA) to attempt a call setup with TC terminal, and dynamically arms the same DPs as set forth above with respect to the TB call setup.

TA 172A sends a Call Setup 1318 to TC 172C which returns a Release Complete message 1320, indicating that there is no answer. Once again, the O_CCSM of TA encounters the O_No_Answer DP and issues a corresponding event 1322 to the SCP 190. The SCP takes the next number in the hunt group list and proceeds in the same manner as described hereinbefore. In this illustration, terminal TD 172D of the list answers the call and provides a Connect message 1330 to TA. Thereafter, the O_CCSM of TA encounters the O_Answer DP and issues a corresponding notification 1332 to the SCP 190 to terminate its service logic.

Referring now to FIGS. 8A–8F, depicted therein are several examples of service invocation and realization in accordance with the teachings of the present invention. An Originating CCSM, such as one discussed in detail hereinabove with respect to FIG. 4, with appropriate DPs is exemplified in these exemplary embodiments. Self-explanatory scenarios involving local access, mobile agent access, external SCP access, etc. are illustrated.

Based upon the foregoing, it should be readily appreciated by those skilled in the art that the present invention provides an advantageous solution for accessing service nodes from end terminals disposed in an IP network by combining the service architectures from the IP and WIN/IN realms into a hybrid approach. Because in the present invention the terminals are allowed to access the service logics in a remote location, the limitation of reduced number of services available within a terminal has been overcome. Further, because the service logics can resolve conflicts and contentions among services and their execution, service interaction issues that are prevalent in the IP-based service architectures have been resolved. On the other hand, the scalability issues common to the network-centric WIN/IN approach have been eliminated on account of the integration of the IP service architecture.

In addition, deficiencies in the current technologies with respect to service mobility are also overcome. Because the IP terminal is in a client-server relationship with the service node server, the mobility of the terminal is no longer a constraint on accessing the service node server, which can be via INAP or IS-41 over SS7, or in some instances, via Java, Corba, etc. Moreover, service mobility is assured because if any intelligent appliance capable of accessing the Internet/WWW and download a piece of code, which essentially is a client's behavioral image expected by the service node server, the appliance can be used for accessing the services. Accordingly, a plethora of communication appliances/devices may be used in accordance herewith: Information appliances, personal/laptop/palmtop computers, Personal Digital Assistants, smart phones, TDMA/CDMA/GSM mobile phones, et cetera.

Moreover, by utilizing the teachings of the present invention, the WIN/IN service logic base that is already installed and market-tested may continue to be re-used even as VoIP network architectures come into existence. Those of ordinary skill in the art should realize that there exist tremendous incentives, economic as well as infrastructure-based, for network operators to re-use the expensive legacy SCP nodes as they migrate towards integrating the cellular infrastructures with IP-based PSNs. Also, because the logic switching is provided within the terminal, services can be dynamically altered or allocated. For example, in the current network-centric Call Forward-Unconditional (CFU) service, all calls are forwarded to a C-number whether or not the subscriber wishes to manually override the call forwarding. With the terminal logic provided in accordance with the teachings of the present invention, the terminal can interrogate the subscriber for the actual call forwarding. Additionally, since some services may be made resident within the terminal itself, individualized service provisioning is possible.

The advantages of providing IP-based VAS in accordance with the universal service invocation and realization architecture provided in the present invention may thus conveniently be summarized as below:

- permits flexible addition and/or removal of services;
- integrates various service implementations, ranging from "one size fits all" to extremely customized services;
- permits the reuse of existing IN/WIN service nodes;
- SCPs and Application Servers may deal with complex service interaction issues and support universal access;
- applicable to various networks (e.g., SIP, H.323) and their VAS solutions (e.g., SIP CPL/CGI, H.450, IN-like, etc.).

In particular, further advantages are evident when implemented in IP terminals:

- makes use of terminal capabilities and relieves network nodes from VAS-related tasks;
- implementation is simple and "lightweight";
- no constraint on network nodes to support standard call models and access to services (e.g., INAP, CAP, ANSI-41, etc.);
- supports universal access to VAS;
- favors interaction with end-user and other local applications (e.g., Web browser, etc.).

Although the VAS architecture of the present invention has been exemplified with particular reference to a H.323- based IP network, it should be understood that other IP network implementations such as, for example, SIP-based networks, may also be used for practicing the teachings contained herein. In the case of a SIP-based network, DP-dependent service triggering may be performed from SIP terminals, SIP proxies or gateways, SIP redirects (collectively, SIP entities), wherein the SIP entities are provided with the CCSMs appropriately modified in accordance herewith. The call control functionality described hereinabove with respect to H.323 implementations is also applicable for a SIP-based implementation and, accordingly, a "dual mode" IP terminal that is SIP- as well as H.323-compliant, in addition to WIN/IN, may be provided advantageously within an IP network.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims. For example, although the teachings of the present invention have been exemplified with a particular SS within the context of the H.450.X Recommendations, it should be understood that other SSs under the existing or future H.450.X Recommendations may also be provisioned in accordance with the teachings of the present invention. That is, in addition to the Call Forward and hunt group services exemplified herein, the teachings hereof may be also applied in the context of numerous other services, for example, toll free and credit card calling, selective call restriction, click to fax, double phone/free phone, split charging, and multimedia applications such as telemedicine, tele-education, video-on-demand, et cetera.

Furthermore, while pluralities of H.323-based terminals have been described in the exemplary embodiments of the present invention, any combination of non-H.323 entities such as mobile stations operable with a variety of air interface standards may be provided for the purposes of the present invention. The IP-based terminals may take several forms themselves: Personal Digital Assistants, Internet phones, laptop computers, personal computers, palmtop computers, pagers, and Information Appliances. In addition, the innovative teachings contained herein may also be practiced in a VoIP network coupled to a PSTN, wherein the fixed entities can trigger service requests to a service node. Accordingly, it should be realized that these and other numerous variations, substitutions, additions, re-arrangements and modifications are contemplated to be within the ambit of the present invention whose scope is solely limited by the claims set forth below.

What is claimed is:

1. A method of accessing a service node from a terminal disposed in an integrated telecommunications network having a Voice-over Internet Protocol (VoIP) network portion and a cellular network portion, wherein the terminal is located inside the VoIP network portion, the method comprising the steps of:

providing an interface module disposed between the service node and the VoIP network portion;

incorporating at least one detection point (DP) in a call control process residing in a Session Initiation Protocol (SIP) entity, wherein the DP is maintained in a user profile repository and wherein the DP further operates to pass control to a service access server when the call control process encounters the DP;

determining, by the service access server, if a service needs to be executed;

if so, sending a service request from the service access server to the service node through the interface module for service execution;

receiving, in the service access server, a result from the service node responsive to the service request; and passing the result from the service access server to the call control process.

2. The method of accessing a service node from a terminal disposed in an integrated telecommunications network as set forth in claim 1, wherein the service request is sent from the service access server to the service node over a HyperText Transfer Protocol (HTTP) interface.

3. The method of accessing a service node from a terminal disposed in an integrated telecommunications network as set forth in claim 1, wherein the service request is sent from the service access server to the service node over a Java interface.

4. The method of accessing a service node from a terminal disposed in an integrated telecommunications network as set forth in claim 1, wherein the service request is sent from the service access server to the service node over a Corba interface.

5. The method of accessing a service node from a terminal disposed in an integrated telecommunications network as set forth in claim 1, wherein the service request is sent from the service access server to the service node over an IP interface.

6. An integrated telecommunications network having a generalized invocation and realization architecture, comprising:

one or more call control modules residing in at least one Session Initiation Protocol (SIP) entity of the telecommunications network, each call control module including a plurality of service-related detection points maintained in a user profile repository;

a Service Logic Environment implemented to execute a service logic portion;

a Service Access server coupled to the Service Logic Environment, the Service Access server including a Service Access component created when an armed detection point is encountered and one or several proxies operating to invoke a service on behalf of the Service Access component, the service proxies mediating between the Service Logic Environment and the call control modules; and a user profile structure specifying the plurality of service-related detection points through information as to when a service is to be invoked for a particular mobile subscriber.

7. The integrated telecommunications network as set forth in claim 6, wherein the service logic portion corresponds to a local service.

8. The integrated telecommunications network as set forth in claim 6, wherein the service logic portion corresponds to a mobile agent-based service.

9. The integrated telecommunications network as set forth in claim 6, wherein the service logic portion corresponds to a remote service residing in a Service Control Point (SCP) node.

10. A generalized service invocation and realization network architecture comprising:

a call control module residing in a Session Initiation Protocol (SIP) entity of the network architecture, the call control module being capable of:

performing basic call control processing for a call with a user;

handling the call related interactions and signalling with the user of the call;
suspending processing of the call upon encounter of a Detection Point (DP) related to the call;
creating a service access component related to the DP;
passing control of the call to the service access component; and
interacting with the service access component prior to resuming processing of the call;

a service execution environment capable of:
executing a service logic related to the DP; and a service access server capable of:
controlling the service access component for:
handling interactions with the service logic; and
handling interactions with the call control module;

a user profile repository capable of:
maintaining the DP associated with the user of the call.

11. The architecture of claim 10, wherein the call control module is further capable of retrieving the DP from the user profile repository.

12. The architecture of claim 10, wherein controlling the service access component by the service access server further comprises evaluating if the service logic should be executed with regard to the DP.

13. The architecture of claim 10, wherein the service execution environment is further capable of managing the interactions between the service logic related to the DP and another service logic related to another DP.

* * * * *